(12) United States Patent
Nakamura

(10) Patent No.: US 10,877,334 B2
(45) Date of Patent: Dec. 29, 2020

(54) SUBSTRATE FOR ELECTRO-OPTICAL DEVICE, ELECTRO- OPTICAL DEVICE, AND ELECTRONIC APPARATUS

(71) Applicant: SEIKO EPSON CORPORATION, Tokyo (JP)

(72) Inventor: Teiichiro Nakamura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/452,749

(22) Filed: Jun. 26, 2019

(65) Prior Publication Data

US 2020/0004076 A1   Jan. 2, 2020

(30) Foreign Application Priority Data

Jun. 27, 2018 (JP) ................................. 2018-122130

(51) Int. Cl.
*G02F 1/1345* (2006.01)
*G02F 1/1333* (2006.01)
*G02F 1/1362* (2006.01)
*G02F 1/1368* (2006.01)

(52) U.S. Cl.
CPC .... *G02F 1/13458* (2013.01); *G02F 1/133351* (2013.01); *G02F 1/136204* (2013.01); *G02F 1/136286* (2013.01); *G02F 1/1368* (2013.01); *G02F 2001/13629* (2013.01)

(58) Field of Classification Search
CPC ........... G02F 1/13458; G02F 1/133351; G02F 1/136204; G02F 1/136286; G02F 2001/13629; G02F 1/1368; G02F 1/1345
See application file for complete search history.

(56) References Cited

U.S. PATENT DOCUMENTS

2007/0040983 A1   2/2007 Ishii
2015/0255487 A1   9/2015 Yoshida et al.

FOREIGN PATENT DOCUMENTS

JP    2007-079541 A    3/2007
JP    2017-078793 A    4/2017
WO   2014/073483 A1    5/2014

*Primary Examiner* — Selim U Ahmed
*Assistant Examiner* — Evan G Clinton
(74) *Attorney, Agent, or Firm* — Oliff PLC

(57) ABSTRACT

In a substrate for an electro-optical device on which a plurality of individual substrates are disposed, a part of a first coupling wiring coupled to a first input terminal as a first coupling terminal on a first individual substrate is disposed between two second input terminals as two adjacent second coupling terminals in a Y direction of a second individual substrate across a scribe line as a dividing line. A part of a second coupling wiring coupled to a second input terminal is disposed between two adjacent first input terminals in the Y direction on a first individual substrate across the scribe line. A distance between the first input terminal and the second input terminal in the X direction is shorter than a distance between the two adjacent first input terminals or between the two second input terminals in the Y direction.

10 Claims, 12 Drawing Sheets

SUBSTRATE FOR ELECTRO-OPTICAL DEVICE, ELECTRO- OPTICAL DEVICE, AND ELECTRONIC APPARATUS

The present application is based on, and claims priority from JP Application Serial Number 2018-122130, filed Jun. 27, 2018, the disclosure of which is hereby incorporated by reference herein in its entirety.

BACKGROUND

1. Technical Field

The present disclosure relates to a substrate for an electro-optical device, an electro-optical device, and an electronic apparatus.

2. Related Art

As an electro-optical device, a liquid crystal device of an active drive type including a pixel electrode and a transistor as a switching element in each of a plurality of pixels has been known. An example of such liquid crystal devices is presented in which a peripheral circuit for driving pixels and an inspection circuit are provided in a peripheral region surrounding a display region in which the plurality of pixels are disposed. The peripheral circuit and the inspection circuit also include transistors. Efforts have been made to reduce the damage caused to these transistors due to static electricity generated during a manufacturing process of the liquid crystal device.

For example, JP-A-2017-78793 discloses an electro-optical device. The electro-optical device includes an inspection terminal disposed on an outer edge side in a peripheral region between an edge of a display region and an outer edge in an element substrate, an inspection circuit disposed on the display region side of the peripheral region, and a wiring path that couples the inspection terminal and the inspection circuit. The wiring path includes a first wiring portion extending from the inspection terminal, and a second wiring portion extending from the inspection circuit. A resistance value of the second wiring portion is larger than a resistance value of the first wiring portion.

According to the electro-optical device in JP-A-2017-78793 described above, even when static electricity enters the wiring path, the inspection circuit can be protected from the static electricity owing to the second wiring portion.

Further, the above-mentioned JP-A-2017-78793 illustrates an example in which a mother substrate, on which a plurality of element substrates are laid out in a matrix shape, is cut off to take out individual element substrates. In the mother substrate, the wiring path in one element substrate of adjacent element substrates crosses over an imaginary dividing line (scribe line) to enter another element substrate, and then returns to cross over the scribe line again to return to the above-mentioned one element substrate to be coupled to the inspection circuit. In other words, an example in which the mother substrate is cut off along the scribe line to divide the first wiring portion extending from the inspection terminal in the element substrate and the second wiring portion extending from the inspection circuit is illustrated.

According to the disposition of the wiring path that couples the inspection terminal and the inspection circuit in the mother substrate of JP-A-2017-78793 described above, as one example of making the resistance value of the second wiring portion extending from the inspection circuit greater than the resistance value of the first wiring portion extending from the inspection terminal, the wiring path is disposed to make the length of the second wiring portion longer than the length of the first wiring portion after the mother substrate is cut off. Accordingly, a distance from the scribe line to the inspection terminal, i.e., a distance from the outer edge of the element substrate to the inspection terminal, needs to be secured in a certain degree. Therefore, there is a problem in that disposition of the inspection circuit and the inspection terminal and the wiring path coupling the inspection circuit and the inspection terminal in consideration of protection from static electricity hinders reduction in the outer shape of the element substrate. In other words, there is a problem in that it is difficult to reduce the outer shape of the element substrate as much as possible to increase the number of element substrates taken out from the mother substrate.

SUMMARY

A substrate for an electro-optical device according to the present application includes a first individual substrate including a first pixel circuit and a first peripheral circuit relating to drive of the first pixel circuit, a second individual substrate including a second pixel circuit and a second peripheral circuit relating to drive of the pixel circuit, the second individual substrate being disposed next to the first individual substrate in a second direction intersecting a first direction across an imaginary dividing line extending in the first direction, a first coupling terminal disposed along the imaginary dividing line on the first individual substrate, a first coupling wiring configured to couple the first coupling terminal and the first peripheral circuit, a second coupling terminal disposed along the imaginary dividing line on the second individual substrate, and a second coupling wiring configured to couple the second coupling terminal and the second peripheral circuit, wherein the first coupling wiring includes a part crossing the imaginary dividing line, and a part disposed between the second coupling terminal and a third coupling terminal next to the second coupling terminal in the first direction, and the second coupling wiring includes a part crossing the imaginary dividing line, and a part disposed between the first coupling terminal and a fourth coupling terminal next to the first coupling terminal in the first direction.

In the substrate for an electro-optical device described above, a distance between the first coupling terminal and the second coupling terminal in the second direction is shorter than a distance between the first coupling terminal and the fourth coupling terminal, which are next to each other in the first direction, and a distance between the second coupling terminal and the third coupling terminal, which are next to each other in the first direction.

In the substrate for an electro-optical device described above, it is preferred that a fifth coupling terminal provided on the first individual substrate, a sixth coupling terminal provided on the second individual substrate, and a third coupling wiring electrically coupled to the third coupling terminal and the fourth coupling terminal, wherein part of the third coupling wiring includes a first part disposed between the first coupling terminal and the fourth coupling terminal, which are next to each other in the first direction across the dividing line, a second part disposed between the second coupling terminal and the third coupling terminal, which are next to each other in the first direction across the dividing line, and a third part connected to the first part and the second part and overlapping the dividing line in a plan view.

On a base material in the substrate for an electro-optical device described above, it is preferred that the first coupling wiring, the second coupling wiring, and the third coupling wiring are provided in a same wiring layer.

In the substrate for an electro-optical device described above, it is preferred that the first coupling terminal and the second coupling terminal are disposed being displaced from each other in the first direction across the dividing line in the second direction.

On the base material in the substrate for an electro-optical device described above, it is preferred that the first coupling wiring and the second coupling wiring are provided on a wiring layer lower than a wiring layer provided with the first coupling terminal and the second coupling terminal, a part of the first coupling wiring is disposed overlapping one side part of the first coupling terminal, and a part of the second coupling wiring is disposed overlapping one side part of the second coupling terminal.

An electro-optical device according to the present application includes the individual substrate obtained by dividing the substrate for an electro-optical device described above, a counter substrate disposed opposed to the individual substrate, and an electro-optical element provided between the individual substrate and the counter substrate.

An electro-optical device according to the present application includes an element substrate provided with a pixel circuit and a peripheral circuit relating to drive of the pixel circuit, on a base material, wherein the element substrate includes a plurality of first coupling terminals relating to an input signal or an output signal of the peripheral circuit, and a first coupling wiring coupled to each of the plurality of first coupling terminals, the plurality of first coupling terminals are disposed on a side-part side along a first direction on the base material, a part of the first coupling wiring is disposed in a second direction intersecting the first direction between the first coupling terminals which are next to each other in the first direction, and a distance from a center of the first coupling terminal to an edge of the base material in the second direction is shorter than a distance between centers of the first coupling terminals, which are next to each other in the first direction.

An electronic apparatus according to the present disclosure includes the electro-optical device described above.

DESCRIPTION OF EXEMPLARY EMBODIMENTS

Exemplary embodiments of the present disclosure will be described below with reference to the accompanying drawings. Note that, in each drawing described below, the size of the parts to be described are illustrated in an enlarged or reduced scale as appropriate to be a recognizable size.

First Exemplary Embodiment

Electro-Optical Device

An electro-optical device of this exemplary embodiment will be described with an example of an active-matrix liquid crystal device including Thin Film Transistors (TFTs) as switching elements of pixels. For example, this liquid crystal device is a small-sized display that can be suitably used as a light modulator (a light bulb) of a projection-type display apparatus (a projector) to be described later.

Figure 1:
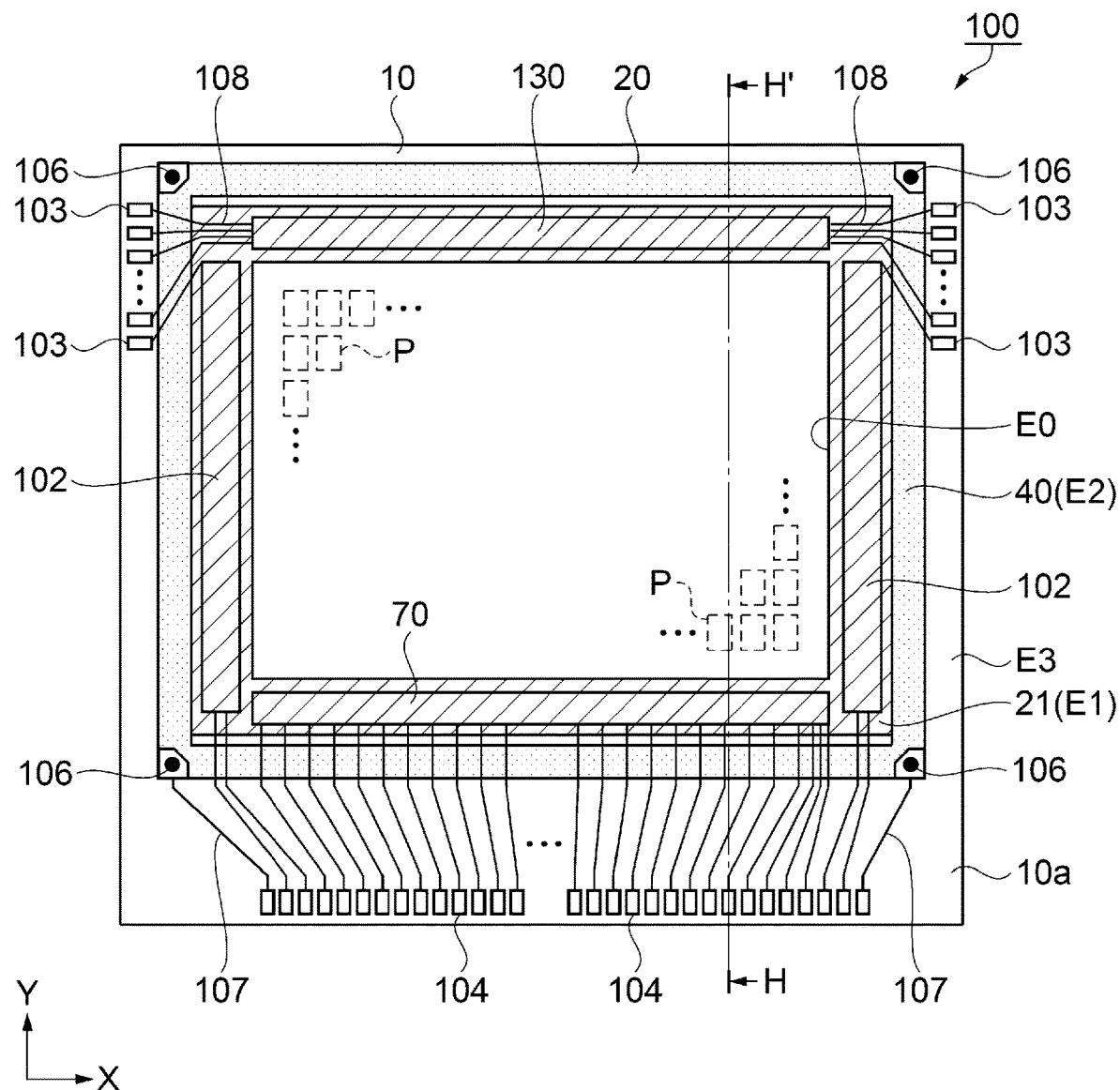
FIG. 1 is a schematic plan view illustrating a configuration of a liquid crystal device of First Exemplary Embodiment.
Figure 2:
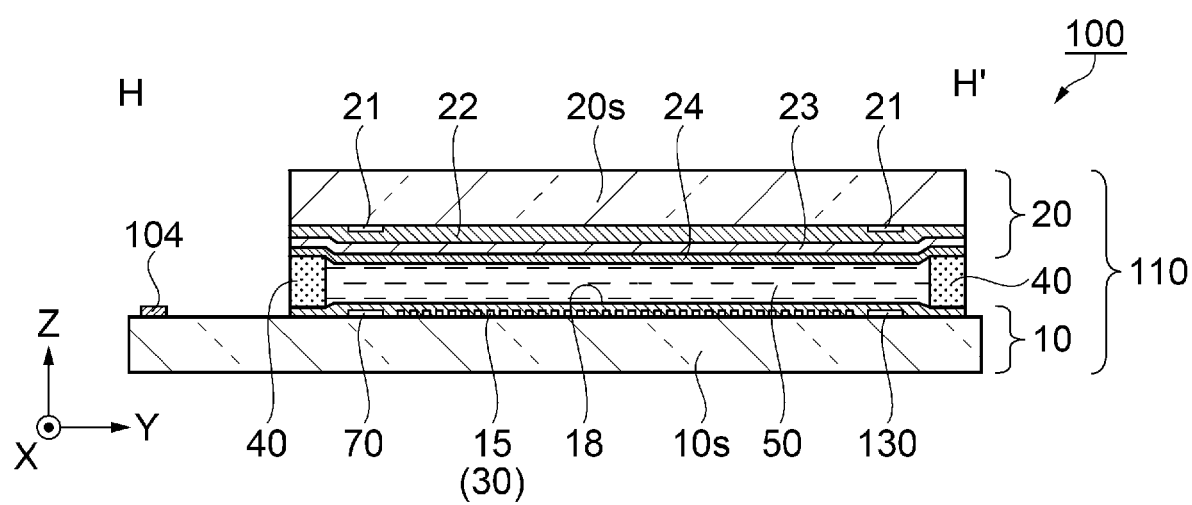
FIG. 2 is a schematic cross-sectional view illustrating the configuration of the liquid crystal device of First Exemplary Embodiment taken along the line H-H' of FIG. 1.

First, a basic configuration of the liquid crystal device serving as the electro-optical device of this exemplary embodiment will be described with reference to FIG. 1 and FIG. 2. FIG. 1 is a schematic plan view illustrating a configuration of the liquid crystal device of First Exemplary Embodiment. FIG. 2 is a schematic cross-sectional view illustrating a structure of the liquid crystal device of First Exemplary Embodiment taken along the line of H-H' of FIG. 1.

As illustrated in FIG. 1 and FIG. 2, a liquid crystal device 100 serving as the electro-optical device of this exemplary embodiment includes an element substrate 10 and a counter substrate 20 that are disposed facing each other, and a liquid crystal layer 50 serving as an electro-optical element interposed between the pair of substrates. For example, a transparent quartz substrate or a transparent glass substrate is used as a base substrate 10s of the element substrate 10 and a base substrate 20s of the counter substrate 20.

The element substrate 10 is slightly larger than the counter substrate 20. The element substrate 10 and the counter substrate 20 are attached together through a seal portion 40 disposed in a frame shape, and liquid crystals having positive or negative dielectric anisotropy are sealed in a gap between the element substrate 10, the counter substrate 20, and the seal portion 40. In this manner, a liquid crystal layer 50 is formed. As the seal portion 40, for example, an adhesive agent such as thermosetting or ultraviolet curable epoxy resin is adopted. Spacers (not illustrated) for keeping an interval between the pair of substrates to be constant are mixed into the seal portion 40.

A partition portion 21 also having a frame shape is provided inside the seal portion 40 disposed in a frame shape. For example, the partition portion 21 is made of metal or a metal compound having a light shielding property. A region inside of the partition portion 21 is a display region E0 including a plurality of pixels P. Note that the display region E0 may include dummy pixels disposed to surround the plurality of pixels P, in addition to the plurality of pixels P contributing to display. Further, although not illustrated in FIG. 1, a light shielding portion that partitions each of the plurality of pixels P in a plan view is provided in the display region E0.

In this exemplary embodiment, a peripheral region from an edge of the display region E0 to an outer edge of the element substrate 10 is referred to as in the following divided manner. A region provided with the partition portion 21 to enclose the display region E0 is referred to as a first peripheral region E1. A region outside of the first peripheral region E1 provided with the seal portion 40 is referred to as a second peripheral region E2. A region outside of the second peripheral region E2 to reach the outer edge of the element substrate 10 is referred to as a third peripheral region E3.

A plurality of external coupling terminals 104 are arrayed on one side portion of the element substrate 10 projecting toward the outer side with respect to the counter substrate 20. A portion where the plurality of external coupling terminals 104 are arrayed is referred to as a terminal portion 10a. In the first peripheral region E1, a demultiplexer circuit 70 is provided between the seal portion 40 along the terminal portion 10a of the element substrate 10 and the display region E0. Further, an inspection circuit 130 is provided between the seal portion 40 along another side portion opposed to the terminal portion 10a and the display region E0. Further, scanning line drive circuits 102 are provided between the display region E0 and the seal portion 40 along other two side portions orthogonal to the terminal portion 10a and opposed to each other. The demultiplexer circuit 70, the scanning line drive circuits 102, and the inspection circuit 130 are collectively referred to as a peripheral circuit.

In the third peripheral region E3, coupling wiring 107 coupled to these demultiplexer circuit 70 and scanning line drive circuits 102 are coupled to the plurality of external coupling terminals 104 arrayed in the terminal portion 10a. Further, coupling wiring 108 coupled to the inspection circuit 130 are coupled to inspection terminals 103 arrayed on the above-mentioned other two side portions orthogonal to the terminal portion 10a and opposed to each other. Detailed configurations of the plurality of inspection terminals 103, the coupling wiring 108 coupled to the plurality of inspection terminals 103, and the like. will be described later.

Hereinafter, a direction along the terminal portion 10a is referred to as an X direction, and a direction along the above-mentioned two side portions orthogonal to the terminal portion 10a and opposed to each other is referred to as a Y direction. Further, a direction orthogonal to a plane defined by the X direction and the Y direction is referred to as a Z direction. Further, a view taken along the Z direction from the counter substrate 20 side is referred to as being planar, or as a plan view. The X direction, the Y direction, and the Z direction in the subsequent drawings are directions matching the X direction, the Y direction, and the Z direction of FIG. 1 and FIG. 2, respectively.

As illustrated in FIG. 2, Thin Film Transistors (hereinafter referred to as TFTs) 30 that are light transmissive pixel electrodes 15 and switching elements provided in each pixel P, signal wiring, and an alignment film 18 covering the TFTs 30 and the signal wiring are formed on a surface of the element substrate 10 on the liquid crystal layer 50 side. Further, a light shielding structure is adopted, which prevents unstable switching operation due to light entering a semiconductor layer of the TFTs 30. The element substrate 10 includes the base substrate 10s, and the pixel electrodes 15, the TFTs 30, the signal wiring, the alignment film, and the like, that are provided on the base substrate 10s.

The partition portion 21, a planarization layer 22 deposited to cover the partition portion 21, a common electrode 23 provided to cover the planarization layer 22, and an alignment film 24 covering the common electrode 23 are provided on the front surface of the counter substrate 20 on the liquid crystal layer 50 side. The counter substrate 20 includes the base substrate 20s, and the partition portion 21, the planarization layer 22, the common electrode 23, the alignment film 24, and the like, that are provided on the base substrate 20s.

As illustrated in FIG. 1, the partition portion 21 is provided in a frame shape at a position to overlap with the demultiplexer circuit 70, the scanning line drive circuits 102, and the inspection circuit 130 in a plan view. Consequently, the partition portion 21 serves a function of blocking light entering from the counter substrate 20 side to prevent a malfunction due to light of the peripheral circuit including these drive circuits. Further, the partition portion 21 blocks to prevent unnecessary stray light from entering the display region E0 to secure a high contrast of display in the display region E0.

For example, the planarization layer 22 is made of an inorganic material such as silicon oxide and has a light transmissive property, and is provided to cover the partition portion 21. Examples of a method of forming such a planarization layer 22 include a deposition method by using a plasma CVD method.

For example, the common electrode 23 is made of a transparent conductive film such as an Indium Tin Oxide (ITO) film, and is provided to cover the planarization layer 22. As illustrated in FIG. 1, the common electrode 23 is electrically coupled to the external coupling terminals 104 through upper and lower conductive portions 106 provided at four corners of the counter substrate 20 and the coupling wiring 107 on the element substrate 10 side.

The alignment film 18 covering the pixel electrodes 15 and the alignment film 24 covering the common electrode 23 are selected based on optical design of the liquid crystal device 100. Examples of such an alignment film include an organic alignment film made of polyimide or the like that has been subjected to an alignment treatment of substantially horizontally aligning liquid crystal molecules having positive dielectric anisotropy, and an inorganic alignment film made of silicon oxide (SiOx) or the like that substantially vertically aligns liquid crystal molecules having negative dielectric anisotropy and deposited by using a vapor phase growth method.

Such a liquid crystal device 100 is a transmissive type, and optical design of a normally white mode in which transmittance of the pixels P is the maximum in a voltage unapplied state, and a normally black mode in which transmittance of the pixels P is the minimum in a voltage unapplied state is adopted. The liquid crystal panel 110 is used in a configuration in which a light-polarizing element is disposed on each of an incident side and an emission side of light of the liquid crystal panel 110 including the element substrate 10 and the counter substrate 20 depending on optical design. Note that the normally black mode is adopted in this exemplary embodiment.

Figure 3:
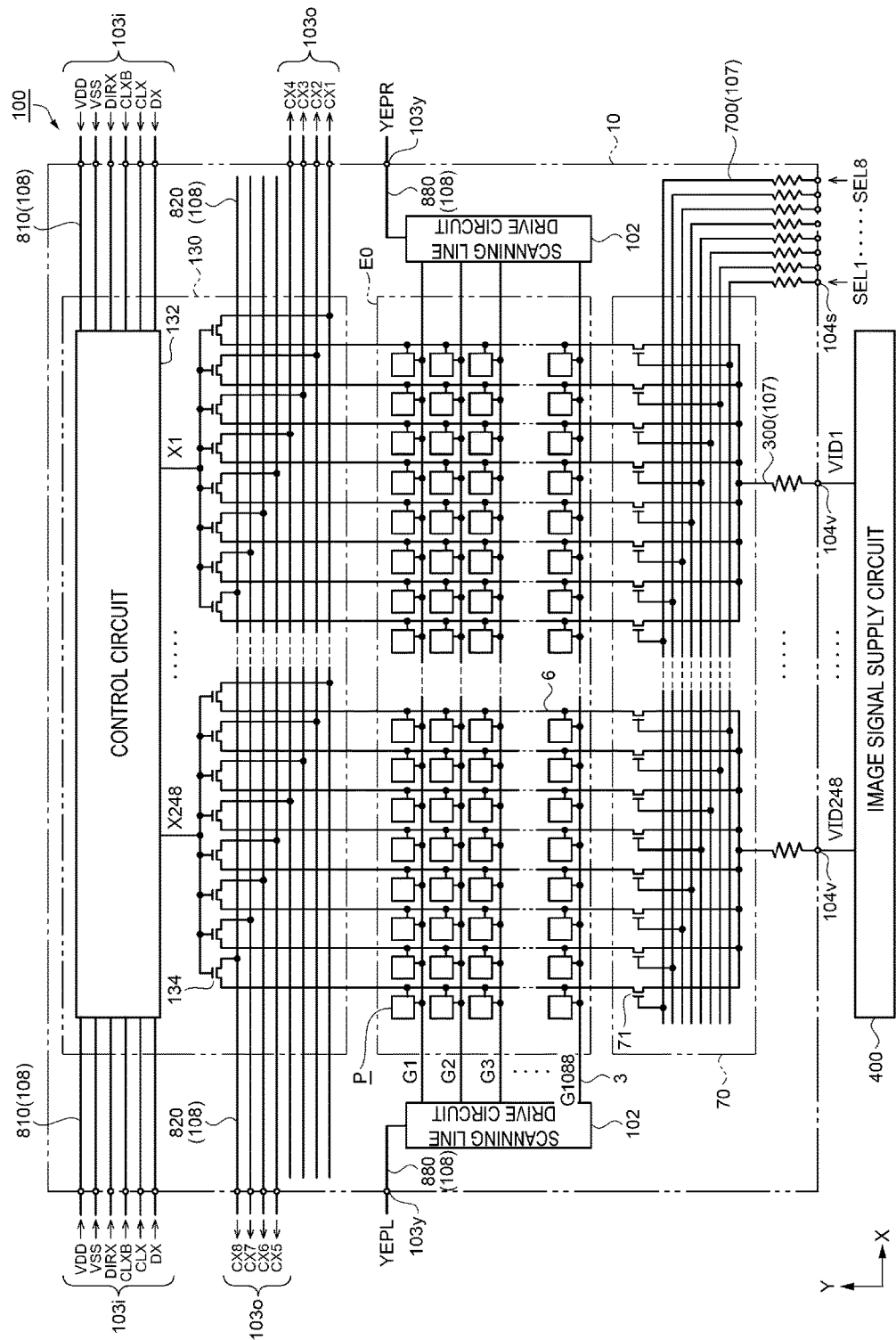
FIG. 3 is a circuit block diagram illustrating an electrical configuration of the liquid crystal device of First Exemplary Embodiment.
Figure 4:
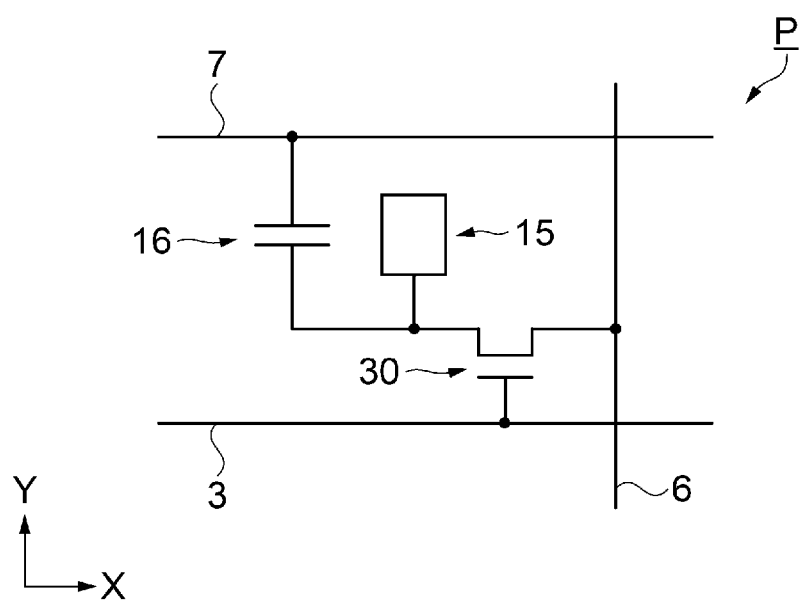
FIG. 4 is an equivalent circuit diagram of a pixel of the liquid crystal device of First Exemplary Embodiment.

Next, an electrical configuration of the liquid crystal device 100 according to this exemplary embodiment will be described with reference to FIG. 3 and FIG. 4. FIG. 3 is a circuit block diagram illustrating the electrical configuration of the liquid crystal device of First Exemplary Embodiment. FIG. 4 is an equivalent circuit diagram of the pixel of the liquid crystal device of First Exemplary Embodiment.

As illustrated in FIG. 3, the liquid crystal device 100 includes the demultiplexer circuit 70, the scanning line drive circuits 102, and the inspection circuit 130 on the element substrate 10. An image signal supply circuit 400 as an external circuit is electrically coupled to image signal terminals 104v among the plurality of external coupling terminals 104 of the element substrate 10.

In the display region E0 of the element substrate 10, for example, 1088 scanning lines 3 are provided to extend in a row direction (i.e., the X direction). Further, 1984 (=248×8) data lines 6, which are grouped in every eighth data line 6, are provided to extend in a column direction (i.e., the Y direction). The scanning lines 3 and the data lines 6 are provided to be electrically insulated from each other. Note that the number of the scanning lines 3 is not limited to 1088, and the number of the data lines 6 is also not limited to 1984. The number of the data lines 6 forming one group is "8" in this exemplary embodiment, but the number suffices to be equal to or greater than "2", and may be "10", for example.

Each of the pixels P is arrayed to correspond to an intersection between the 1088 scanning lines 3 and the 1984 data lines 6. Therefore, in this exemplary embodiment, the pixels P are arrayed in a matrix shape at a predetermined pixel pitch in 1088 rows×1984 columns.

As illustrated in FIG. 4, each pixel P includes the TFT 30 for pixel switching, the pixel electrode 15, and a storage capacitance 16.

The TFT 30 has a source electrically coupled to the data line 6, a gate electrically coupled to the scanning line 3, and a drain electrically coupled to the pixel electrode 15. The storage capacitance 16 is coupled between the drain of the TFT 30 and a capacitance line 7. The TFT 30 can be switched between ON and OFF by scanning signals supplied from the scanning line drive circuits 102.

In the pixel P, image signals having a predetermined level written to the liquid crystal layer 50 (see FIG. 2) through the data line 6 and the pixel electrode 15 are held for a certain period of time between the pixels P and the common electrode 23. The liquid crystal layer 50 utilizes a change in the alignment and the order of assembly of molecules depending on an applied voltage level to modulate light and enable gradation display. In the normally white mode, transmittance with respect to incident light is reduced depending on a voltage applied to each pixel P as one unit. In the normally black mode, transmittance with respect to incident light is increased depending on a voltage applied to each pixel P as one unit. Light having contrast depending on the image signal is emitted from the liquid crystal device 100 as a whole.

The storage capacitance 16 is added in parallel with a liquid crystal capacitance formed between the pixel electrodes 15 and the common electrode 23 in order to prevent the held image signals from leaking.

The pixels P as described above are arrayed in a matrix shape in the display region E0 to enable active matrix drive.

Referring back to FIG. 3, in this exemplary embodiment, to distinguish the eight data lines 6 forming one group, the data lines 6 may be respectively referred to as a, b, c, d, e, f, g, and h series in order from the right side. Specifically, the a series refers to the data lines 6 in 1st, 9th, 17th, . . . , 1977th columns, the b series refers to the data lines 6 in 2nd, 10th, 18th, . . . , 1978th columns, the c series refers to the data lines 6 in 3rd, 11th, 19th, . . . , 1979th columns, the d series refers to the data lines 6 in 4th, 12th, 20th, . . . , 1980th columns, the e series refers to the data lines 6 in 5th, 13th, 21st, . . . , 1981st columns, the f series refers to the data lines 6 in 6th, 14th, 22nd, . . . , 1982nd columns, the g series refers to the data lines 6 in 7th, 15th, 23rd, . . . , 1983rd columns, and the h series refers to the data lines 6 in 8th, 16th, 24th, . . . , 1984th columns.

The scanning line drive circuits 102 include a shift register, and supply scanning signals G1, G2, G3, . . . , G1088 to the scanning lines 3 in 1st, 2nd, 3rd, . . . , 1088th rows. Specifically, the scanning line drive circuits 102 select the scanning lines 3 in the 1st, 2nd, 3rd, . . . , 1088th rows in order during a period of one frame, and brings the scanning signals for the selected scanning lines 3 to a H level corresponding to a selection voltage, and brings the scanning signals for other scanning lines 3 to a L level corresponding to a non-selection voltage.

The image signal supply circuit 400 is separately configured from the element substrate 10, and is coupled to the element substrate 10 through the image signal terminals 104v at the time of display operation. The image signal supply circuit 400 outputs, to the pixel electrodes 15, image signals having a voltage depending on a gray scale of the pixels P included in the pixel electrodes 15. The pixel electrodes 15 correspond to the scanning lines 3 selected by the scanning line drive circuits 102, and the data lines 6 selected by the demultiplexer circuit 70 among the eight data lines 6 belonging to each group. The image signals supplied from the image signal supply circuit 400 to the image signal terminals 104v are supplied to the demultiplexer circuit 70 through image signal lines 300 included in the coupling wiring 107 (see FIG. 1).

In contrast, at the time of inspection, an inspection image signal supply circuit (not illustrated), instead of the image signal supply circuit 400, is coupled to the image signal terminals 104v, and the image signal terminals 104v are supplied with an inspection image signal depending on inspection operation.

Note that, in this exemplary embodiment, as described above, the number of the data lines 6 is "1984", and the number of the image signal terminals 104v is "248" because the data lines 6 are grouped in every eighth data line 6.

The demultiplexer circuit 70 includes transistors 71 provided for each data line 6. For example, the transistors 71 are n channel type, and each drain of the transistors 71 is electrically coupled to one end of the data line 6. Sources of eight transistors 71 corresponding to the data lines 6 belonging to the same group are electrically coupled in common to the image signal line 300 corresponding to the group.

That is, an m-th (note that m represents an integer of 1 or greater and 248 or less, and is counted from the right side in FIG. 3) group of the data lines 6 includes the data line 6 in a (8m−7)-th column of the a series, the data line 6 in a (8m−6)-th column of the b series, the data line 6 in a (8m−5)-th column of the c series, the data line 6 in a (8m−4)-th column of the d series, the data line 6 in a (8m−3)-th column of the e series, the data line 6 in a (8m−2)-th column of the f series, the data line 6 in a (8m−1)-th column of the g series, and the data line 6 in a (8m)-th column of the h series. Therefore, the sources of the transistors 71 corresponding to the group of the data lines 6 of these eight series are electrically coupled in common, and are supplied with an image signal VID(m). A gate of the transistor 71 corresponding to the data line 6 in the (8m−7)-th column is supplied with a control signal SEL1 through a control signal line 700. Similarly, gates of the transistors 71 corresponding to the data lines 6 in the (8m−6)-th column, the (8m−5)-th column, the (8m−4)-th column, the (8m−3)-th column, the (8m−2)-th column, the (8m−1)-th column, and the (8m)-th column are respectively supplied with control signals SEL2 to SEL8 through control signal lines 700 included in the coupling wiring 107 (see FIG. 1). The control signals SEL1 to SEL8 are supplied from a timing control circuit (not illustrated) as an external circuit to the control signal lines 700 through control signal terminals 104s among the external coupling terminals 104.

As illustrated in FIG. 3, the inspection circuit 130 includes a control circuit 132 and TFTs 134 as transistors provided for each data line 6.

The control circuit 132 includes a shift register. At the time of inspection, the control circuit 132 is supplied with input signals of a transfer start pulse DX, a clock signal CLX, an inverted clock signal CLXB, a transfer direction control signal DIRX, a power supply of a reference electric potential VSS and a power supply electric potential VDD, from an externally provided inspection control circuit (not illustrated) through input terminals 103i among the inspection terminals 103 (see FIG. 1) and inspection signal lines 810 included in the coupling wiring 108 (see FIG. 1). At the time of inspection, the control circuit 132 sequentially shifts the transfer start pulse DX in accordance with the transfer direction control signal DIRX and the clock signal CLX and the inverted clock signal CLXB, and outputs transfer pulses X1, X2, . . . , X248 to correspond to each group of the TFTs 134 to be described later. In this exemplary embodiment, the input terminals 103i of the inspection terminals 103 are provided on both sides of the control circuit 132 in the X direction.

For example, the TFTs 134 are of n channel type, and each source of the TFTs 134 is electrically coupled to another end (i.e., another end opposite to the above-mentioned one end of the data line 6 to which the demultiplexer circuit 70 is electrically coupled) of the data line 6. Gates of eight TFTs 134 corresponding to the data lines 6 belonging to the same group are electrically coupled in common, and are supplied with a transfer pulse Xm corresponding to the group from the control circuit 132.

Specifically, the gates of the TFTs 134 corresponding to the data lines 6 in the (8m−7)-th column, the (8m−6)-th column, the (8m−5)-th column, the (8m−4)-th column, the (8m−3)-th column, the (8m−2)-th column, the (8m−1)-th column, and the (8m)-th column forming the m-th group are supplied with the transfer pulses Xm from the control circuit 132 in common.

In the 1st to 248th groups of the data lines 6, the drain of the TFT 134 corresponding to the data line 6 of the a series is electrically coupled in common to an inspection signal line 820 to be read out as an inspection signal CX1 among eight inspection signal lines 820. The number of the inspection signal lines 820 matches the number of the data lines 6 forming one group. Similarly, in each group, the drains of the TFTs 134 corresponding to the data lines 6 of the b, c, d, e, f, g, and h series are respectively electrically coupled in common to the inspection signal lines 820 to be read out as inspection signals CX2, CX3, CX4, CX5, CX6, CX7, and CX8 among the eight inspection signal lines 820. The inspection signal lines 820 are included in the coupling wiring 108 (see FIG. 1), and are electrically coupled to output terminals 103o among the inspection terminals 103 (see FIG. 1). The inspection signals CX1 to CX4 can be extracted from the output terminal 103o provided on the right side in the X direction, and the inspection signals CX5 to CX8 can be extracted from the output terminal 103o provided on the left side in the X direction.

At the time of inspection using the inspection circuit 130 described above, for example, the transfer pulses X1, X2, . . . , X248 are output from the control circuit 132 for each group of the data lines 6 to turn on the TFTs 134 corresponding to each group. In this manner, an electric potential of the data lines 6 previously supplied with the inspection image signal having a predetermined voltage is output to the output terminal 103o through the eight inspection signal lines 820. Then, an external determination means electrically coupled to the eight inspection signal lines 820 determines whether the eight inspection signal lines 820 have a predetermined electric potential to perform inspection of determining whether the functions of the demultiplexer circuit 70 and each data line 6 are normal or abnormal. Note that such inspection is performed in a state that various components of the element substrate 10 are formed on a mother substrate to be described later. Specifically, inspection is performed before the element substrate 10 is taken out, i.e., the liquid crystal panel 110 is taken out from the mother substrate, and therefore inspection can be performed efficiently.

Inspection terminals 103y among the inspection terminals 103 (see FIG. 1) are output terminals for reading out inspection output signals output from the scanning line drive circuits 102 as inspection signals YEP at the time of inspection, and are electrically coupled to the scanning line drive circuits 102 (more specifically, output lines in the last stage of the shift registers of the scanning line drive circuits 102) through inspection signal lines 880 included in the coupling wiring 108 (see FIG. 1). At the time of inspection, the scanning line drive circuits 102 can be inspected by probing the inspection terminals 103y. The inspection signals YEP include, to correspond to scanning directions of the scanning signals, an inspection signal YEPR output from the output line in the last stage of the shift register of the scanning line drive circuit 102 on the right side (R), and an inspection signal YEPL output from the output line in the last stage of the shift register of the scanning line drive circuit 102 on the left side (L).

Here, operation of the liquid crystal device 100 configured as described above will be described with reference to FIG. 3.

The scanning line drive circuit 102 sequentially exclusively brings the scanning signals G1, G2, . . . , G1088 to an H level (i.e., the selection voltage) for each horizontal period during a period of a certain one frame (an n-th frame).

Here, in one horizontal period, the control signals SEL1, SEL2, . . . , SEL8 supplied from the timing control circuit are exclusively brought to a H level in the mentioned order. In accordance with this supply, the image signal supply circuit 400 supplies the image signals VID1, VID2, VID3, . . . , VID248.

Specifically, in a period in which a scanning signal Gi in an i-th row is brought to a H level, when the control signal SEL1 is brought to a H level, the image signal supply circuit 400 simultaneously outputs the image signals VID1, VID2, VID3, . . . , VID248 having an electric potential higher or lower than a common electrode electric potential LCCOM by a voltage in accordance with a gray scale of the pixels P corresponding to the intersection between the i-th scanning line 3 and the data lines 6 of the a series to correspond to the 1st, 2nd, 3rd, . . . , 248th groups. In this case, since only the control signal SEL1 is in a H level, the data lines 6 of the a series are selected (i.e., only the transistors 71 corresponding to the data lines 6 of the a series are turned on). As a result, the image signals VID1, VID2, VID3, . . . , VID248 are respectively supplied to the data lines 6 of the a series (the 1st, 9th, 17th, ..., 1977th columns). In contrast, when the scanning signal Gi is in a H level, the TFTs 30 for pixel switching are turned on (become conductive) in all of the pixels P located in the i-th row. Therefore, the image signals VID1, VID2, VID3, ..., VID248 supplied to the data lines 6 in the a series are respectively applied to the pixel electrodes 15 in the 1st column in the i-th row, the 9th column in the i-th row, the 17th column in the i-th row, ..., the 1977th column in the i-th row.

Next, when the control signal SEL2 is brought to an H level, the image signal supply circuit 400 now simultaneously outputs the image signals VID1, VID2, VID3, ..., VID248 having a voltage in accordance with a gray scale of the pixels P corresponding to intersection between the scanning line 3 in the i-th row and the data lines 6 in the b series to correspond to the 1st, 2nd, 3rd, ..., 248th groups. In this case, since only the control signal SEL2 is in a H level, the data lines 6 of the b series are selected. As a result, the image signals VID1, VID2, VID3, ..., VID248 are respectively supplied to the data lines 6 of the b series (the 2nd, 10th, 18th, ..., 1978th columns) to be respectively applied to the pixel electrodes 15 in the 2nd column in the i-th row, the 10th column in the i-th row, the 18th column in the i-th row, ..., the 1978th column in the i-th row.

Similarly, in a period in which the scanning signal Gi in the i-th row is in an H level, when the control signal SEL3 is brought to a H level, the image signal supply circuit 400 simultaneously outputs the image signals VID1, VID2, VID3, ..., VID248 having a voltage in accordance with a gray scale of the pixels P corresponding to the intersection between the i-th scanning line 3 and the data lines 6 of the c series to respectively correspond to the 1st, 2nd, 3rd, ..., 248th groups. Similarly, when the control signal SEL4 is brought to a H level, the image signal supply circuit 400 simultaneously outputs the image signals VID1, VID2, VID3, ..., VID248 having a voltage in accordance with a gray scale of the pixels P corresponding to the intersection between the i-th scanning line 3 and the data lines 6 of the d series to respectively correspond to the 1st, 2nd, 3rd, ..., 248th groups. When the control signal SEL5 is brought to a H level, the image signal supply circuit 400 simultaneously outputs the image signals VID1, VID2, VID3, ..., VID248 having a voltage in accordance with a gray scale of the pixels P corresponding to the intersection between the i-th scanning line 3 and the data lines 6 of the e series to respectively correspond to the 1st, 2nd, 3rd, ..., 248th groups. When the control signal SEL6 is brought to a H level, the image signal supply circuit 400 simultaneously outputs the image signals VID1, VID2, VID3, ..., VID248 having a voltage in accordance with a gray scale of the pixels P corresponding to the intersection between the i-th scanning line 3 and the data lines 6 of the f series to respectively correspond to the 1st, 2nd, 3rd, ..., 248th groups. When the control signal SEL7 is brought to a H level, the image signal supply circuit 400 simultaneously outputs the image signals VID1, VID2, VID3, ..., VID248 having a voltage in accordance with a gray scale of the pixels P corresponding to the intersection between the i-th scanning line 3 and the data lines 6 of the g series to respectively correspond to the 1st, 2nd, 3rd, ..., 248th groups. When the control signal SEL8 is brought to a H level, the image signal supply circuit 400 simultaneously outputs the image signals VID1, VID2, VID3, ..., VID248 having a voltage in accordance with a gray scale of the pixels P corresponding to the intersection between the i-th scanning line 3 and the data lines 6 of the h series to respectively correspond to the 1st, 2nd, 3rd, ..., 248th groups. Consequently, the image signals VID1, VID2, VID3, ..., VID248 in accordance with the gray scale of each pixel P in the i-th row are supplied to the data lines 6 of the c series (the 3rd, 11th, 19th, ..., 1979th columns) to be respectively applied to the pixel electrodes 15 in the 3rd column in the i-th row, the 11th column in the i-th row, the 19th column in the i-th row, ..., the 1979th column in the i-th row. Similarly, successively, the image signals are supplied to the data lines 6 of the d series (the 4th, 12th, 20th, ..., 1980th columns) to be respectively applied to the pixel electrodes 15 in the 4th column in the i-th row, the 12th column in the i-th row, the 20th column in the i-th row, ..., the 1980th column in the i-th row. Successively, the image signals are supplied to the data lines 6 of the e series (the 5th, 13th, 21st, ..., 1981st columns) to be respectively applied to the pixel electrodes 15 in the 5th column in the i-th row, the 13th column in the i-th row, the 21st column in the i-th row, ..., the 1981st column in the i-th row. Successively, the image signals are supplied to the data lines 6 of the f series (the 6th, 14th, 22th, ..., 1982th columns) to be respectively applied to the pixel electrodes 15 in the 6th column in the i-th row, the 14th column in the i-th row, the 22th column in the i-th row, ..., the 1982th column in the i-th row. Successively, the image signals are supplied to the data lines 6 of the g series (the 7th, 15th, 23rd, ..., 1983rd columns) to be respectively applied to the pixel electrodes 15 in the 7th column in the i-th row, the 15th column in the i-th row, the 23rd column in the i-th row, ..., the 1983rd column in the i-th row. Successively, the image signals are supplied to the data lines 6 of the h series (the 8th, 16th, 24th, ..., 1984th columns) to be respectively applied to the pixel electrodes 15 in the 8th column in the i-th row, the 16th column in the i-th row, the 24th column in the i-th row, ..., the 1984th column in the i-th row.

In this manner, operation of writing a voltage of the image signals in accordance with the gradation to the pixels P in the i-th row is completed. Note that the voltage applied to the pixel electrodes 15 is held until writing of the subsequent (n+1)-th frame by the liquid crystal capacitance even when the scanning signal Gi is brought to an L level.

Substrate for Electro-optical Device

Figure 5:
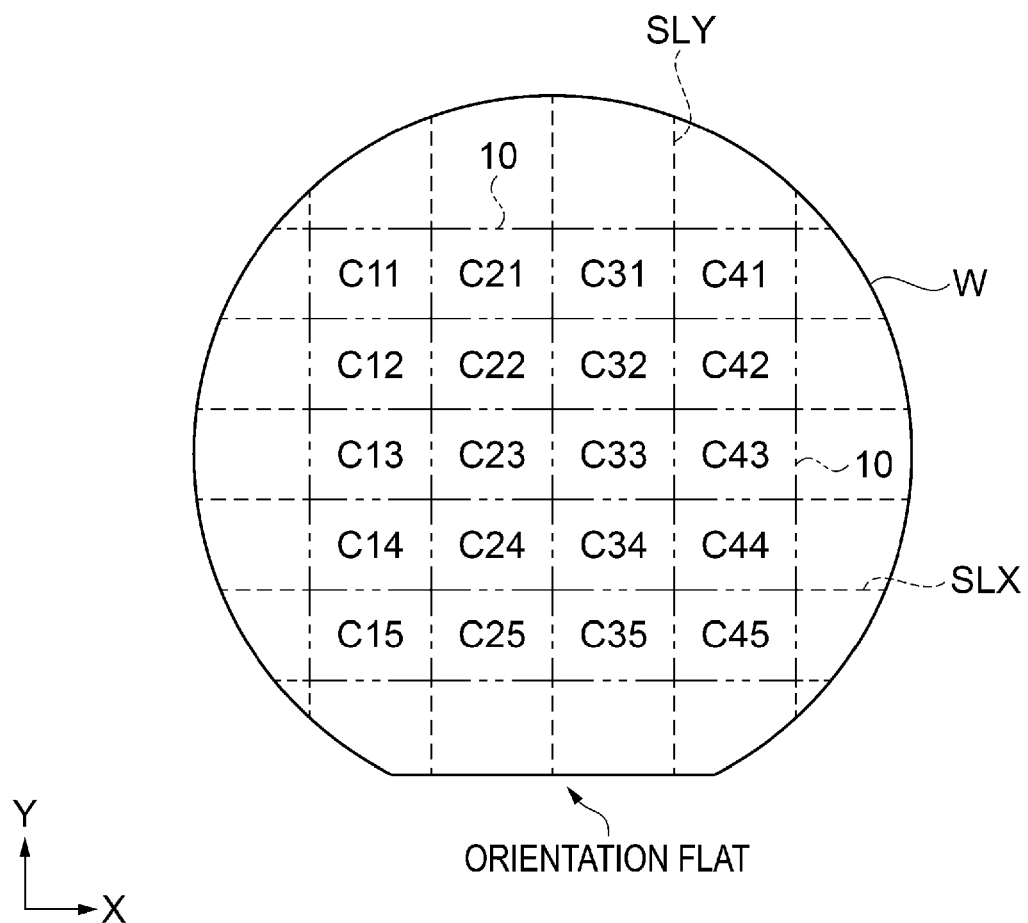
FIG. 5 is a schematic plan view illustrating a mother substrate serving as a substrate for an electro-optical device.

Next, a substrate for an electro-optical device used when the liquid crystal panel 110 is manufactured will be described with reference to FIG. 5. FIG. 5 is a schematic plan view illustrating a mother substrate serving as the substrate for an electro-optical device.

As illustrated in FIG. 5, for example, a transparent quartz substrate is used as a base substrate of a mother substrate W serving as the substrate for an electro-optical device, and the mother substrate W has a wafer-like shape. The element substrate 10 of the liquid crystal panel 110 is manufactured by using the mother substrate W. A plurality of element substrates 10 are patterned (laid out for the sake of designing) on the mother substrate W in the X direction and the Y direction with respect to an orientation flat, which is a cutout of a portion of the mother substrate W having a wafer-like shape. Specifically, each configuration of the element substrate 10 is formed by using the mother substrate W, and then the counter substrate 20 is disposed to face each element substrate 10. Subsequently, liquid crystals are filled in a region enclosed by the seal portion 40 between the element substrate 10 and the counter substrate 20, and then the element substrate 10 and the counter substrate 20 are attached together. After that, the mother substrate W is cut off to take out each liquid crystal panel 110.

The element substrate 10 laid out on the mother substrate W represents one example of an individual substrate of the present disclosure. In this exemplary embodiment, the element substrate 10 serving as the individual substrate is referred to as a Chip. A chip number is assigned according to a planar position of the chip on the mother substrate W. For example, as illustrated in FIG. 5, a chip number "C11" is assigned with respect to the element substrate 10 located on the upper left in FIG. 5. The element substrate 10 adjacent to the chip C11 in the Y direction is assigned a chip number of "C12", and is referred to as a chip C12. The element substrate 10 adjacent to the chip C11 in the X direction is assigned a chip number of "C21", and is referred to as a chip C21. The element substrate 10 adjacent to the chip C21 in the Y direction is assigned a chip number of "C22", and is referred to as a chip C22. In other words, the element substrates 10 (chips) disposed in the X direction and the Y direction in a matrix manner are assigned chip numbers based on a column number in the X direction and a row number in the Y direction. For example, the chip C11 represents one example of a first individual substrate of the present disclosure, and the chip C21 represents one example of a second individual substrate of the present disclosure. The chip C11 and the chip C21 are disposed to be adjacent to each other in the X direction.

As described above, inspection of the plurality of element substrates 10 (chips) patterned on the mother substrate W can be performed on each chip by using the inspection terminals 103 provided in the third peripheral region E3 of the element substrate 10. Note that a plurality of chips may be regarded as one inspection unit, and inspection may be performed on each inspection unit.

Imaginary scribe lines SLX extending in the X direction and imaginary scribe lines SLY extending in the Y direction are present between these plurality of chips. The mother substrate W is cut off along the scribe lines SLX and SLY to take out each element substrate 10 from the mother substrate W. That is, the scribe lines SLX and SLY serve as dividing lines for the sake of designing, along which assembled liquid crystal panels 110 can be taken out. The scribe lines SLX and SLY are imaginary lines not disposed on the mother substrate W. In fact, a mark or the like (not illustrated) that can identify positions of the scribe lines SLX and SLY are formed on the mother substrate W to correspond to each element substrate 10. Note that examples of a method of cutting off the mother substrate W include a dicing method, a groove-forming scribe method, and a laser cut method. In this exemplary embodiment, the dicing method is used in consideration of processing accuracy.

Third Coupling Wiring

Figure 6:
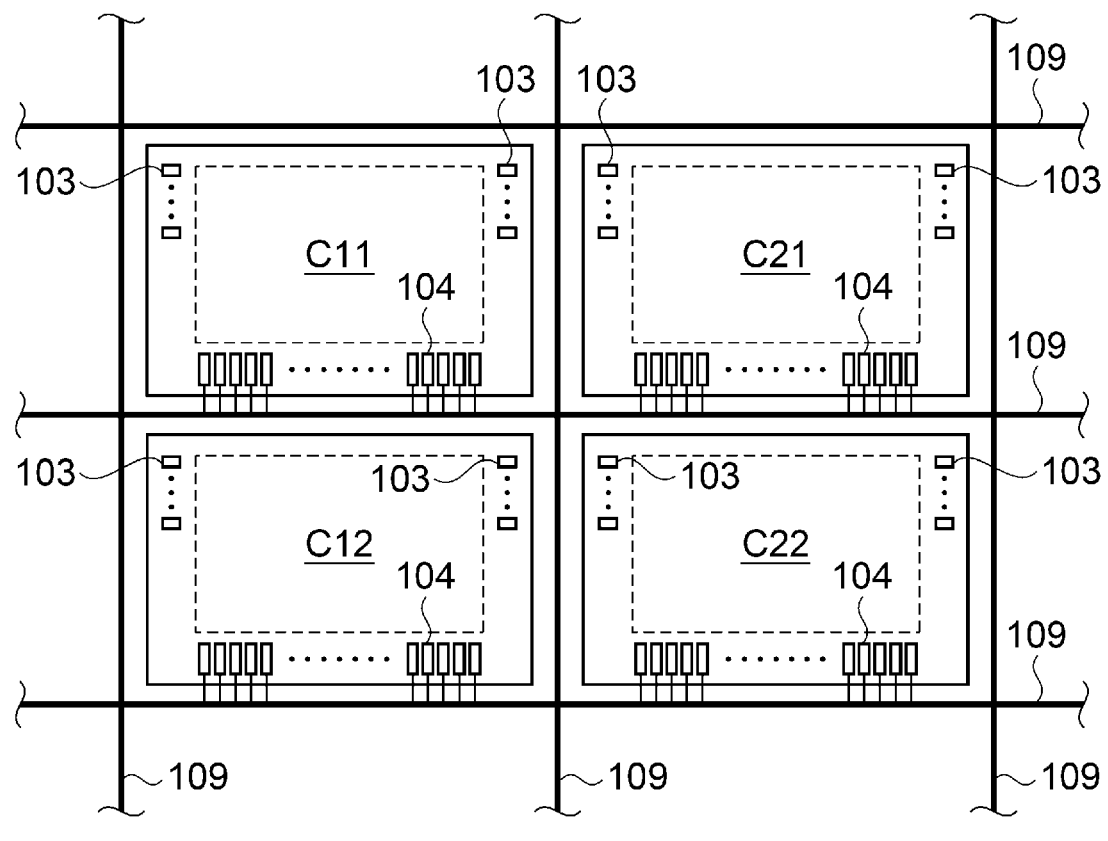
FIG. 6 is a schematic plan view illustrating electrical disposition of third coupling wiring on the mother substrate.

Next, a third coupling wiring that electrically couples the plurality of external coupling terminals 104 will be described with reference to FIG. 6. FIG. 6 is a schematic plan view illustrating electrical disposition of the third coupling wiring on the mother substrate. In this exemplary embodiment, one example of the third coupling wiring of the present disclosure is referred to as a guard line.

As illustrated in FIG. 6, for example, guard lines 109 serving as the third coupling wiring are disposed on the mother substrate W to enclose each of four element substrates 10 disposed in the X direction and the Y direction, i.e., the chips C11, C12, C21, and C22. The guard lines 109 are disposed in a so-called lattice shape on the mother substrate W such that the guard lines 109 extending in the X direction between the chips and each of the plurality of external coupling terminals 104 are electrically coupled to each other.

The guard lines 109 are disposed for the purpose of preventing the coupling wiring, transistors, or the like coupled to the external coupling terminals 104 from being damaged or broken down due to static electricity. Even when static electricity enters the external coupling terminals 104, the static electricity is discharged toward the guard lines 109 having lower resistance. The guard lines 109 are disposed to basically overlap with the scribe lines SLX and SLY in a plan view on the mother substrate W illustrated in FIG. 5. Further, the plurality of inspection terminals 103 of adjacent chips in the X direction are disposed, with the guard lines 109 extending in the Y direction interposed between the plurality of inspection terminals 103. That is, when the mother substrate W is cut off along the scribe lines SLX and SLY, the guard lines 109 are cut off (diced), and the guard lines 109 and the external coupling terminals 104 are removed from each other. Further, as will be described later in detail, a coupling wiring coupled to the inspection terminals 103 is also cut off (diced), and a portion of the coupling wiring is removed.

Note that, although FIG. 6 does not accurately illustrate the number of the input terminals 103$i$ and the output terminals 103$o$ of the inspection terminals 103, the output terminals 103$o$ include the inspection terminal 103$y$ to which the inspection signal YEP is output from the scanning line drive circuit 102 (see FIG. 3).

Disposition of Inspection Terminal and Coupling Wiring

Figure 7:
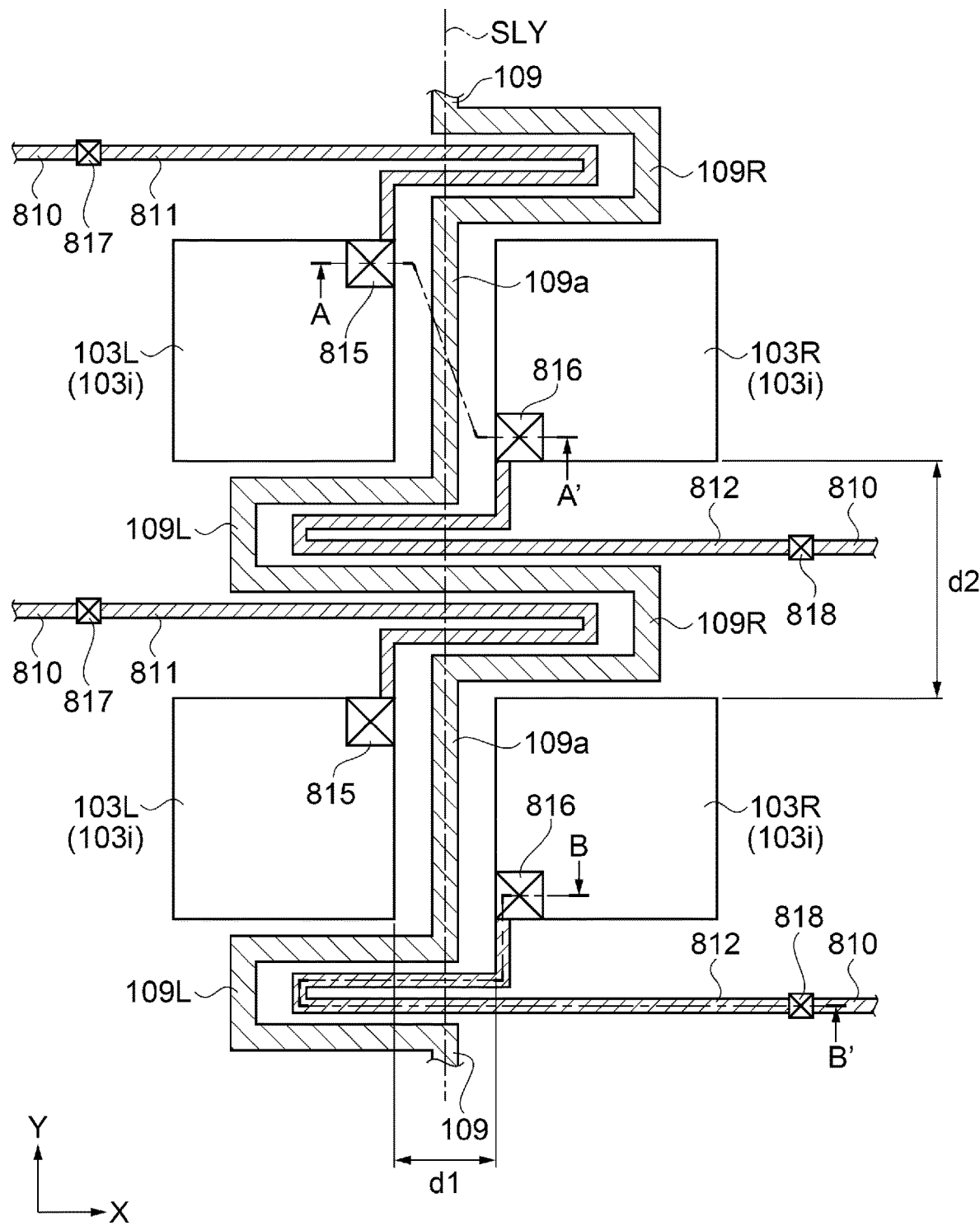
FIG. 7 is an enlarged plan view illustrating disposition of inspection terminals and coupling wiring.

Next, planar disposition of the inspection terminals 103 and coupling wiring coupled to the inspection terminals 103 will be described with reference to FIG. 7. FIG. 7 is an enlarged plan view illustrating disposition of the inspection terminals and the coupling wiring. Note that FIG. 7 illustrates disposition concerning the input terminals 103$i$ of the plurality of inspection terminals 103 of adjacent element substrates 10 (chips) in the X direction on the mother substrate W (for example, illustrates disposition of the input terminals 103$i$ in the chip C11 serving as the first individual substrate and the chip C21 serving as the second individual substrate of FIG. 6). Among two input terminals 103$i$ opposed to each other across the scribe line SLY extending in the Y direction, the input terminal 103$i$ located on the left side in the X direction with respect to the scribe line SLY is referred to as an input terminal 103L, and the input terminal 103$i$ located on the right side in the X direction with respect to the scribe line SLY is referred to as an input terminal 103R. In this way, the two input terminals 103$i$ are distinguished from each other.

In this exemplary embodiment, the input terminal 103L represents one example of a first coupling terminal of the present disclosure, and a coupling wiring electrically coupled to the input terminal 103L represents one example of a first coupling wiring of the present disclosure. Further, the input terminal 103R represents one example of a second coupling terminal of the present disclosure, and a coupling wiring electrically coupled to the input terminal 103R represents one example of a second coupling wiring of the present disclosure. Further, as described above, the guard line 109 represents one example of the third coupling wiring of the present disclosure. Further, the Y direction represents one example of a first direction of the present disclosure, and the X direction represents one example of a second direction of the present disclosure.

As illustrated in FIG. 7, each of the input terminal 103L and the input terminal 103R of this exemplary embodiment has a square shape in a plan view. The length of one side of each of the input terminals 103L and 103R is 150 μm (micrometers), for example. A plurality of input terminals 103L are arrayed at intervals on the left side in the X direction with respect to the scribe line SLY. Similarly, a plurality of input terminals 103R are arrayed at intervals on the right side in the X direction with respect to the scribe line SLY. The input terminals 103L and the input terminals 103R are disposed to face each other in the X direction across the scribe line SLY.

The guard line 109 serving as the third coupling wiring is basically disposed along the scribe line SLY. Specifically, the guard line 109 includes a portion extending along the scribe line SLY in the Y direction, a first part 109L bending toward the left side with respect to the portion extending in the Y direction and then returning, and a second part 109R bending toward the right side with respect to the portion extending in the Y direction and then returning. The first part 109L and the second part 109R are coupled together after each of the first part 109L and the second part 109R bends.

The first part 109L of the guard line 109 is disposed between two adjacent input terminals 103L in the Y direction. The second part 109R of the guard line 109 is disposed between two adjacent input terminals 103R in the Y direction. The portion of the guard line 109 overlapping with the scribe line SLY and extending in the Y direction is hereinafter referred to as a third part 109a.

The line width of each of the third part 109a of the guard line 109 is 30 μm, for example. In this exemplary embodiment, when the mother substrate W is diced along the scribe line SLY, the mother substrate W is cut off. Accordingly, such cutting removes the third part 109a of the guard line 109 overlapping with the scribe line SLY and extending in the Y direction from the mother substrate W. Note that, although not illustrated in FIG. 7, such a configuration also applies to a portion of the guard line 109 extending in the X direction. Such cutting removes a portion of the guard line 109 overlapping with the scribe line SLX and extending in the X direction from the mother substrate W.

A first coupling wiring 811 is electrically coupled to the input terminal 103L on the lower side among the two adjacent input terminals 103L in the Y direction. A portion of the first coupling wiring 811 crosses over the scribe line SLY serving as the dividing line to be disposed between the two adjacent input terminals 103R in the Y direction. A second coupling wiring 812 is electrically coupled to the input terminal 103R on the upper side among the two adjacent input terminals 103R in the Y direction. A portion of the second coupling wiring 812 crosses over the scribe line SLY to be disposed between the two adjacent input terminals 103L in the Y direction.

More specifically, the first coupling wiring 811 once extends from a contact hole 815 provided at a corner portion on the upper right corner of the input terminal 103L toward the adjacent input terminal 103L side in the Y direction (toward the upper side), and then extends toward the right side in the X direction to cross over the scribe line SLY. Then, the first coupling wiring 811 is disposed to extend inside the second part 109R at which the guard line 109 bends to bend in a similar manner and return to the input terminal 103L side (toward the left side). The first coupling wiring 811 that has returned to the input terminal 103L side (toward the left side) is coupled to the inspection signal line 810 described above through a contact hole 817.

The second coupling wiring 812 once extends from a contact hole 816 provided at a corner portion on the lower left corner of the input terminal 103R toward the adjacent input terminal 103R side in the Y direction (toward the lower side), and then extends toward the left side in the X direction to cross over the scribe line SLY. Then, the second coupling wiring 812 is disposed to extend inside the first part 109L at which the guard line 109 bends to bend in a similar manner and return to the input terminal 103R side (toward the right side). The second coupling wiring 812 that has returned toward the input terminal 103R side (toward the right side) is coupled to the inspection signal line 810 described above through a contact hole 818.

The first coupling wiring 811, the first part 109L at which the guard line 109 bends, and the portion at which the second coupling wiring 812 bends are disposed between the two adjacent input terminals 103L in the Y direction.

The second coupling wiring 812, the second part 109R at which the guard line 109 bends, and the portion at which the first coupling wiring 811 bends are disposed between the two adjacent input terminals 103R in the Y direction.

The line width of each of the first coupling wiring 811 and the second coupling wiring 812 is 5 μm, for example. The line width of the third part 109a of the guard line 109 along the scribe line SLY is 30 μm, for example. The line width of each of the bending first part 109L and the bending second part 109R is 20 μm, for example. A distance d1 between the input terminal 103L and the input terminal 103R in the X direction is 50 μm, for example. A distance d2 between the two adjacent input terminals 103L or between the two adjacent input terminals 103R in the Y direction is 120 μm, for example. In other words, the distance d1 between the input terminal 103L and the input terminal 103R in the X direction is shorter than the distance d2 between the two adjacent input terminals 103L or between the two adjacent input terminals 103R in the Y direction. In this exemplary embodiment, since the input terminals 103L and 103R are a square having one side of 150 μm, the distance d2 between the two adjacent input terminals 103L or between the two adjacent input terminals 103R in the Y direction is shorter than the length of one side of the input terminals 103L and 103R. In this case, a disposition pitch of the input terminals 103L and 103R in the Y direction is 270 μm.

Inspection Terminal and Wiring Structure of Coupling Wiring

Figure 8:
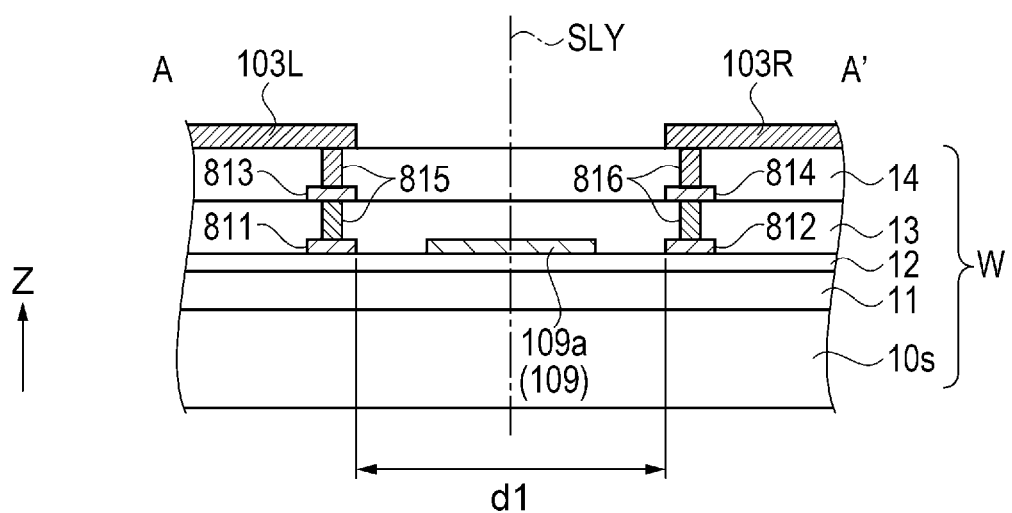
FIG. 8 is a schematic cross-sectional view illustrating the inspection terminals and a wiring structure of the coupling wiring taken along the line of A-A' FIG. 7.
Figure 9:
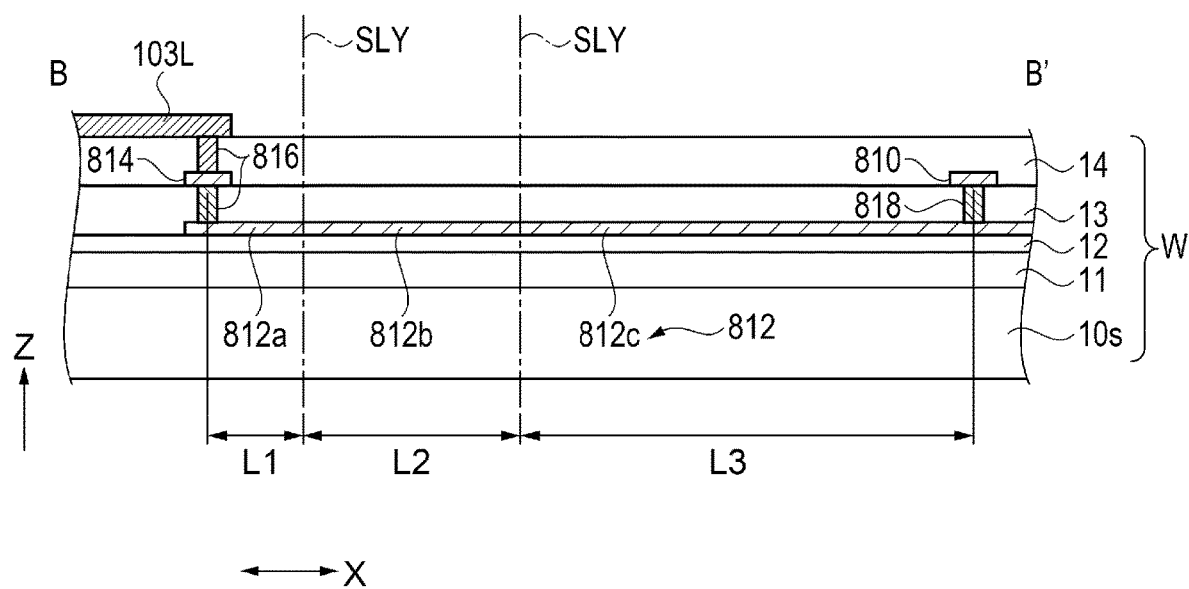
FIG. 9 is a schematic cross-sectional view illustrating the inspection terminals and a wiring structure of the coupling wiring taken along the line of B-B' FIG. 7.

Next, the inspection terminal 103 and a wiring structure of the coupling wiring coupled to the inspection terminal 103 will be described with reference to FIG. 8 and FIG. 9. FIG. 8 is a schematic cross-sectional view illustrating the inspection terminal and the wiring structure of the coupling wiring taken along the line A-A' of FIG. 7. FIG. 9 is a schematic cross-sectional view illustrating the inspection terminal and the wiring structure of the coupling wiring taken along the line B-B' of FIG. 7. Note that the line A-A' of FIG. 7 is a line segment crossing over the input terminal 103L and the input terminal 103R as the inspection terminals 103 opposed to each other across the guard line 109 in the X direction. The line B-B' of FIG. 7 is a line segment along the second coupling wiring 812 extending from the input terminal 103R as the inspection terminal 103.

As illustrated in FIG. 8, first, a first insulating film 11 is formed on the base substrate 10s. The first insulating film 11 is formed by using a silicon oxide film (a None-doped Silicate Glass (NSG) film) or a silicon nitride film (a $Si_xN_y$ film), for example, to which no impurities are intentionally introduced. Examples of a method of forming the first insulating film 11 may include an atmospheric pressure CVD method, a low-pressure CVD method, and a plasma CVD method, using a processing gas such as monosilane ($SiH_4$), dichlorosilane ($SiCl_2H_2$), tetraethoxysilane (TEOS), and ammonia. The film thickness of the first insulating film 11 is 200 nm, for example. Note that, in the display region E0, the semiconductor layer of the TFTs 30 in a pixel circuit is formed on the first insulating film 11. Further, also in the first peripheral region E1, the semiconductor layer of the transistor in the peripheral circuit is formed on the first insulating film 11.

Next, a gate insulating film 12 is formed on the first insulating film 11. The gate insulating film 12 includes a double-layer structure including, for example, a first silicon oxide film obtained by thermally oxidizing a semiconductor film made of silicon, and a second silicon oxide film formed under a high-temperature condition of from 700° C. to 900° C. by using a low-pressure CVD method. The film thickness of the gate insulating film 12 is 75 nm, for example.

Next, the guard line 109, the first coupling wiring 811, and the second coupling wiring 812 are formed on the gate insulating film 12. The wiring is made of the same material in the same wiring layer as a gate electrode of TFT 30 and the transistor in the peripheral circuit described above, and are formed by using a conductive polysilicon film, for example. The conductive polysilicon film is formed to contain phosphorus atoms at concentration of $1 \times 10^{19}$ pieces/$cm^3$ or greater in a polysilicon film by depositing the polysilicon film doped with phosphorus (P) with a low-pressure CVD method, and subsequently performing a phosphorus diffusion treatment. The film thickness of the polysilicon film containing phosphorus (P) is 150 nm, for example. Note that an atom doped in the polysilicon film is not limited to phosphorus (P).

Next, a second insulating film 13 covering the guard line 109, the first coupling wiring 811, and the second coupling wiring 812 are formed. The second insulating film 13 is formed by using a silicon-based oxide film, such as the NSG film described above, or a Phospho Silicate Glass (PSG) film containing phosphorus (P), a Boro Silicate Glass (BSG) film containing boron, and a Boro-phospho Silicate Glass (BPSG) film containing boron (B) and phosphorus (P). Examples of a method of forming these silicon-based oxide films may include an atmospheric pressure CVD method, a low-pressure CVD method, and a plasma CVD method, using monosilane, dichlorosilane, TEOS, triethyl borate (TEB), trimethyl phosphate (TMPO), or the like. The film thickness of the second insulating film 13 is 300 nm, for example.

Next, a through hole penetrating the second insulating film 13 to reach the first coupling wiring 811 and the second coupling wiring 812 is formed. Then, a conductive film is deposited to cover at least an inner wall of the through hole and the conductive film is patterned to form relay layers 813 and 814. The relay layer 813 is electrically coupled to the first coupling wiring 811. The relay layer 814 is electrically coupled to the second coupling wiring 812. Examples of such a conductive film include a multi-layer structure including a layer made of low-resistance metal of aluminum (Al), titanium (Ti), or titanium nitride (TiN), for example. The thickness of each of the relay layers 813 and 814 is 500 nm, for example.

Next, a third insulating film 14 covering the relay layers 813 and 814 is formed. The third insulating film 14 is also formed by using a silicon-based oxide film, such as the NSG film described above, or a PSG film containing phosphorus (P), a BSG film containing boron, and a BPSG film containing boron (B) and phosphorus (P). The film thickness of the third insulating film 14 is 300 nm, for example.

Next, a through hole penetrating the third insulating film 14 to reach the relay layer 813 and the relay layer 814 is formed. Then, a conductive film is deposited to cover at least an inner wall of the through hole and the conductive film is patterned to form input terminals 103L and 103R. The input terminal 103L is electrically coupled to the relay layer 813.

The input terminal 103R is electrically coupled to the relay layer 814. Such a conductive film uses the same transparent conductive film as the pixel electrode 15 of the pixel circuit in the display region E0. Specifically, the input terminal 103L formed on the third insulating film 14 is coupled to the first coupling wiring 811 through the relay layer 813 and the contact hole 815. The input terminal 103R formed on the third insulating film 14 is coupled to the second coupling wiring 812 through the relay layer 814 and the contact hole 816. The film thickness of each of the input terminals 103L and 103R is 150 nm, for example.

According to such a wiring structure, the first coupling wiring 811, the second coupling wiring 812, and the guard line 109 are formed in the same wiring layer.

As illustrated in FIG. 9, as described in the above, the second coupling wiring 812 coupled to the input terminal 103R through the relay layer 814 and the contact hole 816 includes a first part 812a extending from the contact hole 816 to reach the scribe line SLY, a second part 812b crossing over the scribe line SLY to extend in the X direction and reaching the scribe line SLY again after bending, and a third part 812c extending from the scribe line SLY to reach at least the contact hole 818.

As described above, the second coupling wiring 812 is formed on the gate insulating film 12, and is coupled to the inspection signal line 810 formed on the second insulating film 13 through the contact hole 818 penetrating the second insulating film 13. The relay layer 814 and the inspection signal line 810 are formed in the same wiring layer.

When the mother substrate W is cut off (diced, in this exemplary embodiment) along the scribe line SLY, the second part 812b of the second coupling wiring 812 having a length L2 is removed. After the cutting, a length L3 of the third part 812c of the second coupling wiring 812 to be electrically coupled to an inspection circuit 130 through the inspection signal line 810 is longer than a length L1 of the first part 812a of the second coupling wiring 812 to be electrically coupled to the input terminal 103R. In other words, after the cutting, electrical resistance of the third part 812c of the second coupling wiring 812 is larger than electrical resistance of the first part 812a. Such deposition of the second coupling wiring 812 also applies to the first coupling wiring 811 disposed between the input terminal 103L and the contact hole 817.

According to the mother substrate W serving as the substrate for an electro-optical device and the liquid crystal device 100 manufactured by using the mother substrate W of the first exemplary embodiment described above, the following effects can be achieved.

(1) A portion of the first coupling wiring 811 coupled to the input terminal 103L crosses over the scribe line SLY to be disposed between two adjacent input terminals 103R in the Y direction among the plurality of input terminals 103R. Further, a portion of the second coupling wiring 812 coupled to the input terminal 103R opposed to the input terminal 103L across the scribe line SLY crosses over the scribe line SLY to be disposed between the two adjacent input terminals 103L in the Y direction among the plurality of input terminals 103L. Therefore, the distance d1 between the input terminal 103L and the input terminal 103R in the X direction can be reduced, as compared to a case in which the first coupling wiring 811 and the second coupling wiring 812 as well as their bending portions are disposed between the input terminal 103L and the input terminal 103R in the X direction. In other words, the length of the element substrate 10 (chip) in the X direction can be reduced, and accordingly the number of the element substrates 10 (chips) to be laid out on the mother substrate W can be increased. Therefore, when the liquid crystal device 100 is manufactured by using the mother substrate W, productivity of the element substrate 10 is enhanced, and a manufacturing cost of the liquid crystal device 100 can be reduced.

(2) The mother substrate W includes the guard line 109 serving as the third coupling wiring that couples the plurality of external coupling terminals 104 for each laid out element substrate 10 (chip). That is, even when static electricity enters the external coupling terminals 104 during a manufacturing process of the element substrate 10, the static electricity can be discharged through the guard line 109. Thus, the transistors, the wiring, or the like included in the peripheral circuit coupled to the external coupling terminals 104 can be prevented from being damaged or broken down due to static electricity. Note that, the guard line 109 is basically disposed along the scribe lines SLX and SLY, and thus the plurality of external coupling terminals 104 and the guard lines 109 can be separated by cutting the mother substrate W along the scribe lines SLX and SLY.

Further, the guard line 109, the first coupling wiring 811, and the second coupling wiring 812 are formed in the same layer on the base substrate 10s. Therefore, a distance from the guard line 109 to the first coupling wiring 811 and the second coupling wiring 812 can be substantially secured, as compared to a case in which the guard line 109, the first coupling wiring 811, and the second coupling wiring 812 are provided on the base substrate 10s to be formed in different wiring layers with intermediation of an insulating film. Consequently, static electricity conducted to the guard line 109 is less liable to enter the first coupling wiring 811 and the second coupling wiring 812.

(3) When the mother substrate W is cut off along the scribe line SLY, the second coupling wiring 812 coupled between the input terminal 103R and the contact hole 818 is cut off halfway. The electrical resistance of the third part 812c to be coupled to the contact hole 818 is greater than the electrical resistance of the first part 812a to be coupled to the input terminal 103R. The third part 812c and the first part 812a are remaining portions of the second coupling wiring 812 after the cutting. Therefore, even when static electricity enters the third part 812c through an end surface of the cut element substrate 10 along the Y direction, the static electricity is consumed by the third part 812c. Thus, the inspection circuit 130 can be protected from the static electricity. Note that the same configuration of the second coupling wiring 812 also applies to the first coupling wiring 811 to be electrically coupled to the inspection circuit 130. That is, the element substrate 10, i.e., the liquid crystal device 100, that can protect the inspection circuit 130 from static electricity after cutting can be provided.

Second Exemplary Embodiment

Figure 10:
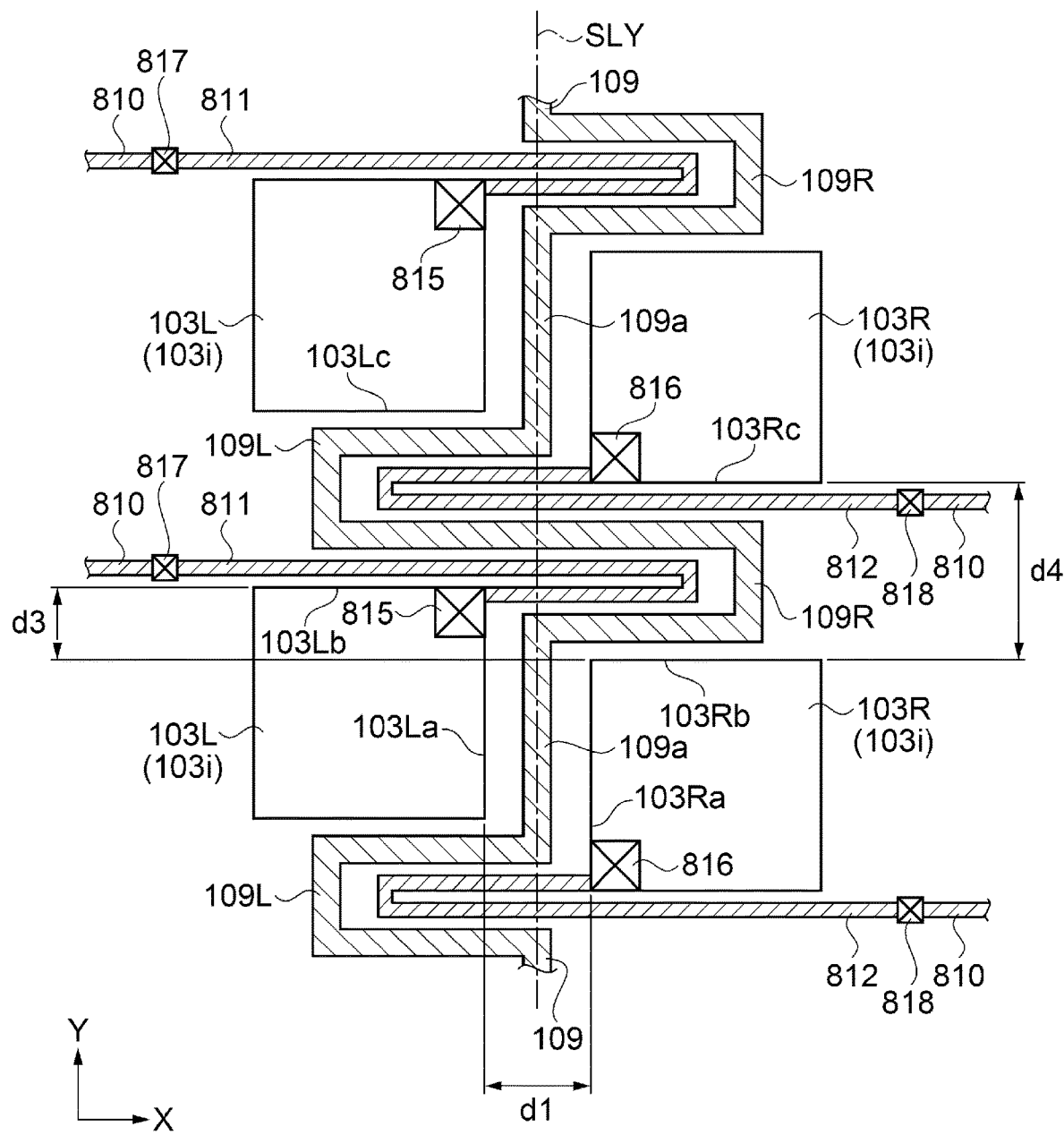
FIG. 10 is a schematic plan view illustrating disposition of the inspection terminals and the coupling wiring of Second Exemplary Embodiment.

Next, a substrate for an electro-optical device and an electro-optical device manufactured by using the substrate for an electro-optical device of Second Exemplary Embodiment will be described with reference to FIG. 10 with an example of a mother substrate W and a liquid crystal device, similar to First Exemplary Embodiment described above. The mother substrate W serving as the substrate for an electro-optical device of Second Exemplary Embodiment is different from the mother substrate W of First Exemplary Embodiment described above in disposition of the inspection terminals 103 serving as the first coupling terminal and the second coupling terminal. Accordingly, the same configurations as the configurations of the mother substrate W of the first exemplary embodiment are denoted by the same reference signs, and detailed description of the same configurations will be omitted. FIG. 10 is a schematic plan view illustrating disposition of the inspection terminals and the coupling wiring of Second Exemplary Embodiment.

As illustrated in FIG. 10, each of the input terminal 103L and the input terminal 103R of this exemplary embodiment has a square shape in a plan view, and the length of one side of each of the input terminal 103L and the input terminal 103R is 150 µm, for example, which is the same as First Exemplary Embodiment described above. A plurality of input terminals 103L are arrayed at intervals on the left side in the X direction with respect to the scribe line SLY. Similarly, a plurality of input terminals 103R are arrayed at intervals on the right side in the X direction with respect to the scribe line SLY. The input terminals 103L and the input terminals 103R are disposed to face each other in the X direction across the scribe line SLY, but are disposed to be deviated from each other in the Y direction. A distance d1 between a side portion 103La of the input terminal 103L and a side portion 103Ra of the input terminal 103R opposed to each other across the scribe line SLY in the X direction is the same as First Exemplary Embodiment described above, and is 50 µm, for example. Among adjacent input terminals 103R in the Y direction, a distance d4 between a side portion 103Rb of one input terminal 103R and a side portion 103Rc of another input terminal 103R is 100 µm, for example. In other words, among adjacent input terminals 103L in the Y direction, a distance d4 between a side portion 103Lb of one input terminal 103L and a side portion 103Lc of another input terminal 103L is 100 µm, for example. Specifically, in this exemplary embodiment, a disposition pitch of the input terminals 103L and 103R in the Y direction is 250 µm.

The guard line 109 is the same as the guard line 109 of First Exemplary Embodiment described above, and includes a part extending along the scribe line SLY in the Y direction, a first part 109L bending toward the left side with respect to the portion extending in the Y direction and then returning, and a second part 109R bending toward the right side with respect to the portion extending in the Y direction and then returning. The first part 109L and the second part 109R are coupled together after each of the first part 109L and the second part 109R bends.

The first part 109L of the guard line 109 is disposed between two adjacent input terminals 103L in the Y direction. The second part 109R of the guard line 109 is disposed between two adjacent input terminals 103R in the Y direction.

The line width of the third part 109a of the guard line 109 overlapping with the scribe line SLY and extending in the Y direction is 30 µm, for example. Meanwhile, the length of the third part 109a of the guard line 109 overlapping with the scribe line SLY and extending in the Y direction is shorter than the length in First Exemplary Embodiment described above.

The first coupling wiring 811 extends from a contact hole 815 provided at a corner portion on the upper right corner of the input terminal 103L toward the right side in the X direction to cross over the scribe line SLY. Then, the first coupling wiring 811 is disposed to extend to an inner side of the second part 109R at which the guard line 109 bends to bend in a similar manner and return to the input terminal 103L side (toward the left side). The first coupling wiring 811 that has returned toward the input terminal 103L side (toward the left side) is coupled to the inspection signal line 810 described above through a contact hole 817.

The second coupling wiring 812 extends from a contact hole 816 provided at a corner portion on the lower left corner of the input terminal 103R toward the left side in the X direction to cross over the scribe line SLY. Then, the second coupling wiring 812 is disposed to extend to an inner side of the first part 109L at which the guard line 109 bends to bend in a similar manner and return to the input terminal 103R side (toward the right side). The second coupling wiring 812 that has returned toward the input terminal 103R side (toward the right side) is coupled to the inspection signal line 810 described above through a contact hole 818.

The first coupling wiring 811, the first part 109L at which the guard line 109 bends, and the part at which the second coupling wiring 812 bends are disposed between the two adjacent input terminals 103L in the Y direction.

The second coupling wiring 812, the second part 109R at which the guard line 109 bends, and the part at which the first coupling wiring 811 bends are disposed between the two adjacent input terminals 103R in the Y direction. As compared to the first exemplary embodiment described above, a portion of the first coupling wiring 811 extending from the contact hole 815 toward the upper side of the Y direction and a portion of the second coupling wiring 812 extending from the contact hole 816 toward the lower side of the Y direction are omitted.

The line width of each of the first coupling wiring 811 and the second coupling wiring 812 is the same as the first exemplary embodiment described above, and is 5 µm, for example. The line width of each of the first part 109L and the second part 109R at which the guard line 109 bends is the same as First Exemplary Embodiment described above, and is 20 µm, for example.

A distance d3 is a position deviation amount between the input terminal 103L and the input terminal 103R in the Y direction. The distance d3 is a value slightly greater than a value obtained by adding together the line width of a portion of the guard line 109 extending in the X direction and the line width of a portion of the first coupling wiring 811 or the second coupling wiring 812 extending in the X direction. In this exemplary embodiment, the distance d3 is 30 µm, for example.

According to the mother substrate W and the liquid crystal device manufactured by using the mother substrate W of Second Exemplary Embodiment described above, the following effects can be achieved in addition to the same effects as the effects (1) to (3) of First Exemplary Embodiment described above.

(4) The input terminal 103L and the input terminal 103R interpose the scribe line SLY in the X direction, and are disposed to be deviated from each other by the distance d3 in the Y direction. Consequently, the first coupling wiring 811, the second coupling wiring 812, and the guard line 109 serving as the third coupling wiring can be disposed by efficiently utilizing a space between adjacent input terminals 103L in the Y direction and between adjacent input terminals 103R in the Y direction. Therefore, the distance d4 between adjacent input terminals 103L (or input terminals 103R) in the Y direction is smaller than the distance d2 between adjacent input terminals 103L (or input terminals 103R) in the Y direction of First Exemplary Embodiment described above. That is, the length of the element substrate 10 in the Y direction can be reduced to be smaller than the length in First Exemplary Embodiment described above, depending on the number of the plurality of inspection terminals 103 arrayed in the Y direction.

Third Exemplary Embodiment

Figure 11:
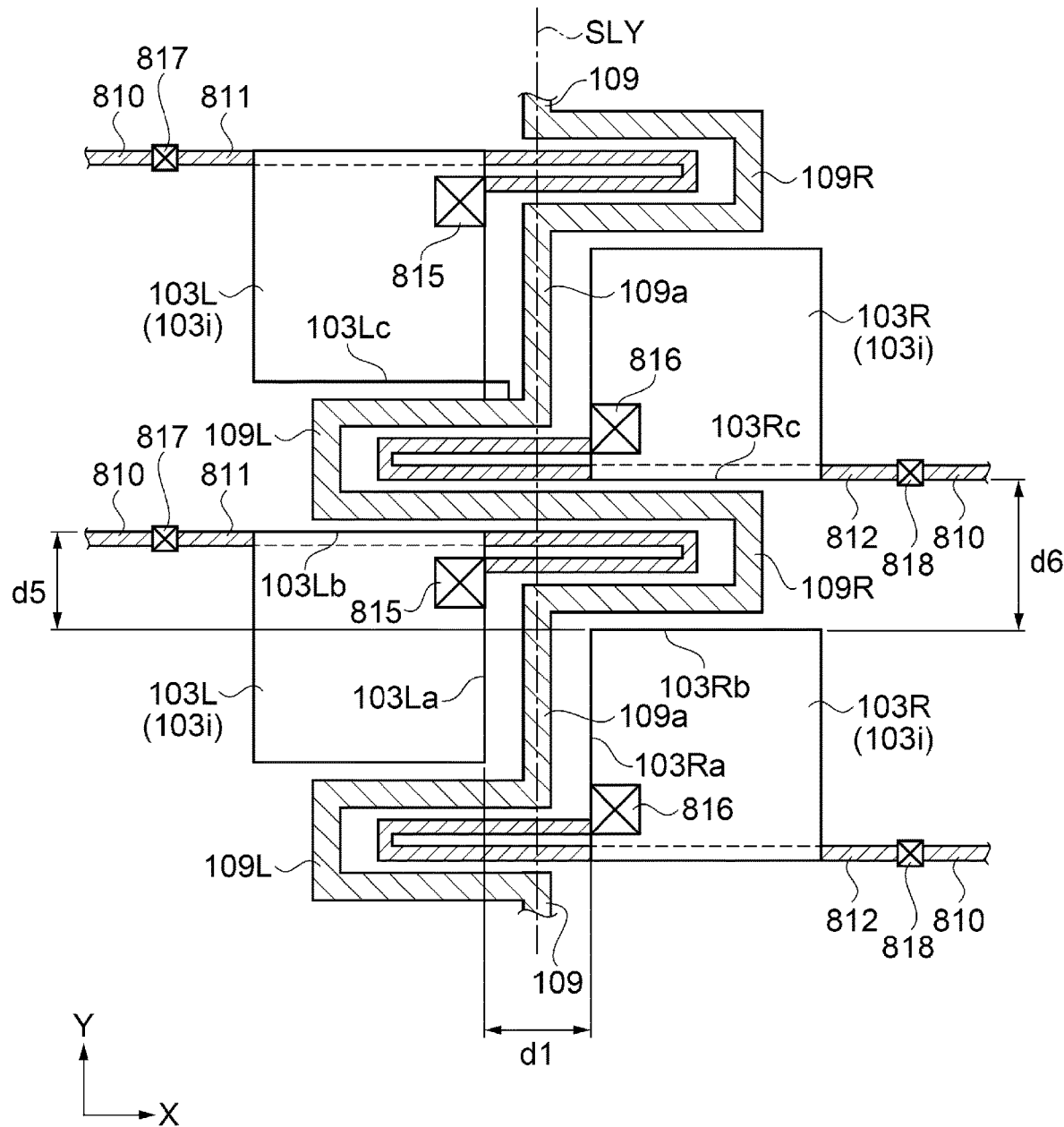
FIG. 11 is a schematic plan view illustrating disposition of the inspection terminals and the coupling wiring of Third Exemplary Embodiment.

Next, a substrate for an electro-optical device and an electro-optical device manufactured by using the substrate for an electro-optical device of Third Exemplary Embodiment will be described with reference to FIG. 11 with an example of a mother substrate W and a liquid crystal device, similar to First Exemplary Embodiment described above. The mother substrate W serving as the substrate for an electro-optical device of Third Exemplary Embodiment is different from the mother substrate W of First Exemplary Embodiment described above in disposition of the inspection terminals 103 serving as the first coupling terminal and the second coupling terminal. Accordingly, the same configurations as the configurations of the mother substrate W of First Exemplary Embodiment described above are denoted by the same reference signs, and detailed description of the same configurations will be omitted. FIG. 11 is a schematic plan view illustrating disposition of the inspection terminals and the coupling wiring of Third Exemplary Embodiment.

As illustrated in FIG. 11, each of the input terminal 103L and the input terminal 103R of this exemplary embodiment has a square shape in a plan view, and the length of one side of each of the input terminal 103L and the input terminal 103R is the same as First Exemplary Embodiment described above, and is 150 µm, for example. A plurality of input terminals 103L are arrayed at intervals on the left side in the X direction with respect to the scribe line SLY. Similarly, a plurality of input terminals 103R are arrayed at intervals on the right side in the X direction with respect to the scribe line SLY. The input terminals 103L and the input terminals 103R are disposed to face each other in the X direction across the scribe line SLY, but are disposed to be deviated from each other in the Y direction. A distance d1 between a side portion 103La of the input terminal 103L and a side portion 103Ra of the input terminal 103R opposed to each other across the scribe line SLY in the X direction is the same as First Exemplary Embodiment described above, and is 50 µm, for example. Among adjacent input terminals 103R in the Y direction, a distance d6 between a side portion 103Rb of one input terminal 103R and a side portion 103Rc of another input terminal 103R is 70 µm, for example. Similarly, among adjacent input terminals 103L in the Y direction, a distance d6 between a side portion 103Lb of one input terminal 103L and a side portion 103Lc of another input terminal 103L is 70 µm, for example. That is, in this exemplary embodiment, a disposition pitch of the input terminals 103L and 103R in the Y direction is 220 µm.

The guard line 109 is the same as the guard line 109 of First Exemplary Embodiment described above, and includes a third part 109a extending along the scribe line SLY in the Y direction, a first part 109L bending toward the left side with respect to the portion extending in the Y direction and then returning, and a second part 109R bending toward the right side with respect to the portion extending in the Y direction and then returning. The first part 109L and the second part 109R are coupled together after each of the first part 109L and the second part 109R bends.

The first part 109L of the guard line 109 is disposed between two adjacent input terminals 103L in the Y direction. The second part 109R of the guard line 109 is disposed between two adjacent input terminals 103R in the Y direction.

The line width of the third part 109a of the guard line 109 overlapping with the scribe line SLY and extending in the Y direction is 30 µm, for example. Meanwhile, the length of the third part 109a of the guard line 109 overlapping with the scribe line SLY and extending in the Y direction is shorter than the length of Second Exemplary Embodiment described above.

The first coupling wiring 811 extends from a contact hole 815 provided near a corner portion on the upper right corner of the input terminal 103L toward the right side in the X direction to cross over the scribe line SLY. Then, the first coupling wiring 811 is disposed to extend to an inner side of the second part 109R at which the guard line 109 bends to bend in a similar manner and return to the input terminal 103L side (toward the left side). The first coupling wiring 811 that has returned toward the input terminal 103L side (toward the left side) is disposed in a lower layer of the input terminal 103L along the side portion 103Lb of the input terminal 103L to be coupled to the inspection signal line 810 described above through a contact hole 817.

The second coupling wiring 812 extends from a contact hole 816 provided near a corner portion on the lower left corner of the input terminal 103R toward the left side in the X direction to cross over the scribe line SLY. Then, the second coupling wiring 812 is disposed to extend to an inner side of the first part 109L at which the guard line 109 bends to bend in a similar manner and return to the input terminal 103R side (toward the right side). The second coupling wiring 812 that has returned toward the input terminal 103R side (toward the right side) is disposed in a lower layer of the input terminal 103R along the side portion 103Rc of the input terminal 103R to be coupled to the inspection signal line 810 described above through a contact hole 818.

A portion of the first coupling wiring 811 is disposed to overlap with the side portion 103Lb of the input terminal 103L in a plan view, and thus the contact hole 815 is disposed to be slightly deviated from the corner portion of the input terminal 103L in the Y direction. Similarly, a portion of the second coupling wiring 812 is disposed to overlap with the side portion 103Rc of the input terminal 103R in a plan view, and thus the contact hole 816 is disposed to be slightly deviated from the corner portion of the input terminal 103R in the Y direction.

The first part 109L at which the guard line 109 bends and the part at which the second coupling wiring 812 bends are disposed between the two adjacent input terminals 103L in the Y direction.

The second part 109R at which the guard line 109 bends and the part at which the first coupling wiring 811 bends are disposed between the two adjacent input terminals 103R in the Y direction. As compared to Second Exemplary Embodiment described above, the distance d6 is shorter than the distance d4 by the line width of the first coupling wiring 811 extending in the X direction after bending (or, the line width of the second coupling wiring 812 extending in the X direction after bending).

The line width of each of the first coupling wiring 811 and the second coupling wiring 812 is the same as First Exemplary Embodiment described above, and is 5 µm, for example. Similar to First Exemplary Embodiment described above, the line width of the third part 109a of the guard line 109 along the scribe line SLY is also 30 µm, for example. The line width of each of the bending first part 109L and the bending second part 109R is also 20 µm, for example.

A distance d5 is a position deviation amount between the input terminal 103L and the input terminal 103R in the Y direction. The distance d5 is a value slightly larger than a value obtained by adding together the line width of a portion of the guard line 109 extending in the X direction and the length of the bending portion of the first coupling wiring 811 or the second coupling wiring 812 in the Y direction. In this exemplary embodiment, the distance d5 is 40 µm, for example.

From the viewpoint of reducing the distance between adjacent input terminals 103L (or input terminals 103R) in the Y direction, disposing the input terminal 103L (the input terminal 103R) to overlap a portion of the guard line 109 extending in the X direction in a plan view. In such disposition, however, static electricity entering the guard line 109 may be liable to enter the input terminal 103L (or the input terminal 103R) as the inspection terminal 103 through an insulating film. In this exemplary embodiment, the coupling wiring to be electrically coupled to the inspection terminal 103 is disposed to overlap with the inspection terminal 103 in a plan view to further reduce the disposition pitch of the inspection terminals 103 in the Y direction.

According to the mother substrate W and the liquid crystal device manufactured by using the mother substrate W of Third Exemplary Embodiment described above, the following effects can be achieved in addition to the same effects as the effects (1) to (3) of First Exemplary Embodiment described above.

(5) The input terminal 103L and the input terminal 103R interpose the scribe line SLY in the X direction, and are disposed to be deviated from each other by the distance d5 in the Y direction. Further, a portion of the first coupling wiring 811 is disposed to overlap with the side portion 103Lb of the input terminal 103L in a plan view. Similarly, a portion of the second coupling wiring 812 is disposed to overlap with the side portion 103Rc of the input terminal 103R in a plan view. Consequently, the first coupling wiring 811, the second coupling wiring 812, and the guard line 109 can be disposed by efficiently utilizing a space between two adjacent input terminals 103L in the Y direction and between two adjacent input terminals 103R in the Y direction. Therefore, the distance d6 between adjacent input terminals 103L (or input terminals 103R) in the Y direction is smaller than the distance d4 between adjacent input terminals 103L (or input terminals 103R) in the Y direction of Second Exemplary Embodiment described above. That is, the length of the element substrate 10 in the Y direction can be reduced to be smaller than the length in Second Exemplary Embodiment described above, depending on the number of the plurality of inspection terminals 103 arrayed in the Y direction.

The element substrate 10 manufactured by using the mother substrate W of First Exemplary Embodiment to Third Exemplary Embodiment described above includes the plurality of input terminals 103L (103i) as the inspection terminals 103 serving as the first coupling terminals relating to the input signal of the inspection circuit 130 serving as the peripheral circuit, and the first coupling wiring 811 coupled to each of the plurality of input terminals 103L. The plurality of input terminals 103L are disposed close to a side portion of the base substrate 10s along the Y direction. A portion of the first coupling wiring 811 is disposed in the X direction crossing the Y direction between adjacent input terminals 103L in the Y direction. A distance from the center of the input terminal 103L to an end portion of the base substrate 10s in the X direction is shorter than a distance between the centers of adjacent input terminals 103L in the Y direction.

Further, the element substrate 10 includes the plurality of input terminals 103R (103i) as the inspection terminals 103 serving as the second coupling terminals relating to the input signal of the inspection circuit 130, and the second coupling wiring 812 coupled to each of the plurality of input terminals 103R. The input terminals 103R (103i) are disposed on another side portion opposed to the side portion along which the input terminals 103L are arrayed in the Y direction. A portion of the second coupling wiring 812 is disposed in the X direction crossing the Y direction between adjacent input terminals 103R in the Y direction. A distance from the center of the input terminal 103R to an end portion of the base substrate 10s in the X direction is shorter than a distance between the centers of adjacent input terminals 103R in the Y direction. The configuration of the input terminals 103L and 103R (103i) and the coupling wiring relating to the input terminals 103L and 103R (103i) is also applied to the output terminal 103o that is the inspection terminals 103 other than the input terminals 103L and 103R (103i), and the inspection terminal 103y relating to the output signal of the scanning line drive circuit 102 serving as the peripheral circuit.

That is, owing to the mother substrate W of First Exemplary Embodiment to Third Exemplary Embodiment described above, the element substrate 10 has a configuration capable of reducing the length of the side portion at least in the X direction, as compared to known technology. When the liquid crystal device is manufactured by using such a mother substrate W, productivity of the element substrate 10 is enhanced, and the liquid crystal device that can achieve cost reduction can be provided, as compared to known technology.

Fourth Exemplary Embodiment

Electronic Apparatus

Figure 12:
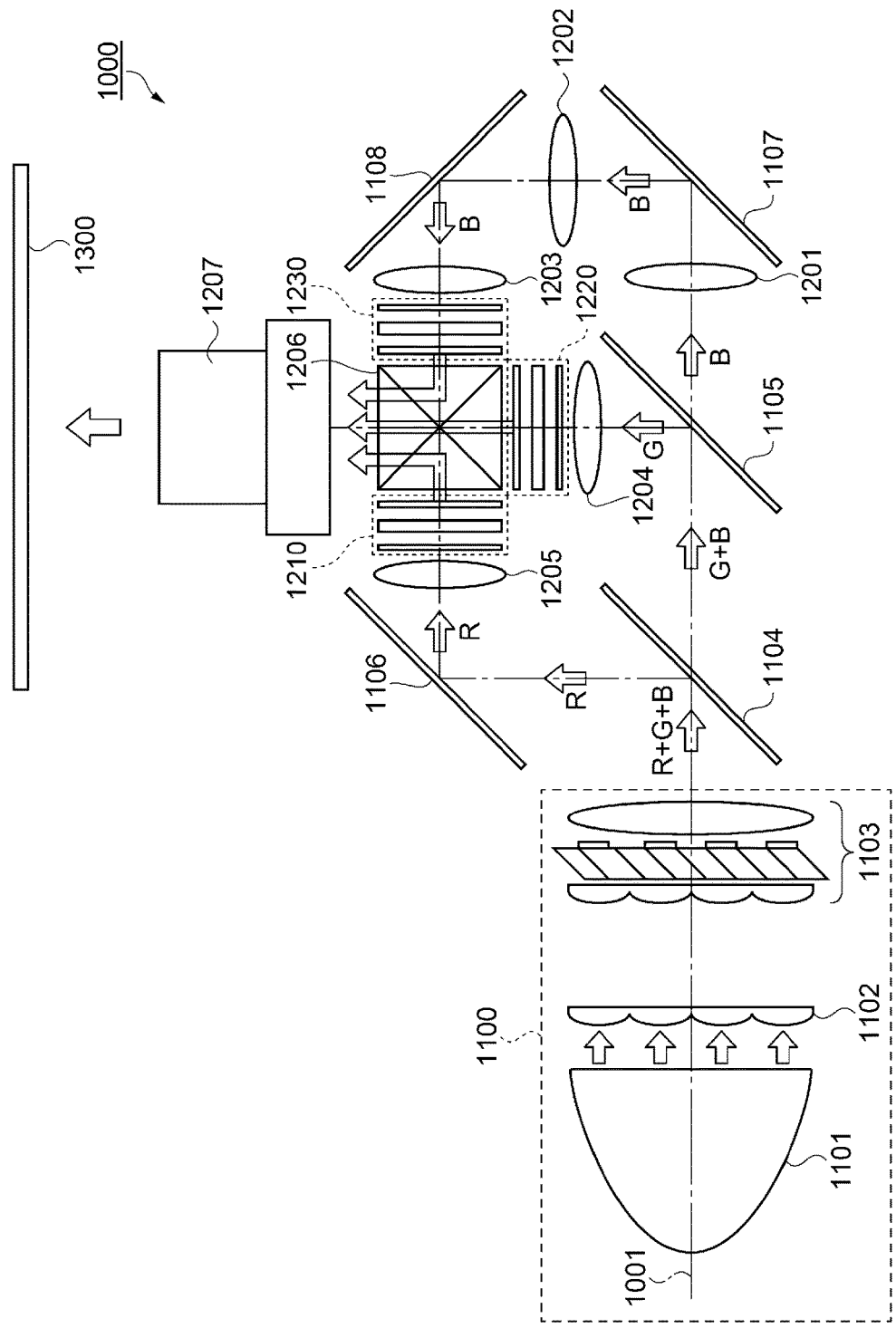
FIG. 12 is a schematic diagram illustrating a configuration of a projection-type display apparatus serving as an electronic apparatus of Fourth Exemplary Embodiment.

Next, an electronic apparatus of this exemplary embodiment will be described with reference to FIG. 12 with an example of a projection-type display apparatus. FIG. 12 is a schematic diagram illustrating a configuration of the projection-type display apparatus serving as the electronic apparatus of Fourth Exemplary Embodiment.

As illustrated in FIG. 12, a projection-type display apparatus 1000 serving as the electronic apparatus of this exemplary embodiment includes a polarized light illumination apparatus 1100 disposed along a system optical axis 1001, two dichroic mirrors 1104 and 1105 as light separation elements, three reflection mirrors 1106, 1107, and 1108, five relay lenses 1201, 1202, 1203, 1204, and 1205, three transmissive liquid crystal light bulbs 1210, 1220, and 1230 as light modulators, a cross dichroic prism 1206 as a light synthesis element, and a projection lens 1207.

The polarized light illumination apparatus 1100 generally includes a lamp unit 1101 as a light source including a white light source such as an extra-high pressure mercury lamp or a halogen lamp, an integrator lens 1102, and a polarization conversion element 1103.

The dichroic mirror 1104 reflects red light (R) of a polarized light flux emitted from the polarized light illumination apparatus 1100 and transmits green light (G) and blue light (B). The other dichroic mirror 1105 reflects the green light (G) transmitted by the dichroic mirror 1104 and transmits the blue light (B).

The red light (R) reflected by the dichroic mirror 1104 is reflected by the reflection mirror 1106 and subsequently enters the liquid crystal light bulb 1210 via the relay lens 1205.

The green light (G) reflected by the dichroic mirror 1105 enters the liquid crystal light bulb 1220 via the relay lens 1204.

The blue light (B) transmitted through the dichroic mirror 1105 enters the liquid crystal light bulb 1230 via a light guide system including three relay lenses 1201, 1202, and 1203 and two reflection mirrors 1107 and 1108.

The liquid crystal light bulbs 1210, 1220, and 1230 are each disposed to face an incident surface of each type of color light of the cross dichroic prism 1206. The color light that has entered the liquid crystal light bulbs 1210, 1220, and 1230 is modulated based on image information (image signal) and is emitted toward the cross dichroic prism 1206. In this prism, four rectangular prisms are attached together, and on inner surfaces of the prisms, a dielectric multilayer film configured to reflect red light and a dielectric multilayer film configured to reflect blue light are formed in a cross shape. Three types of color light are synthesized by these dielectric multilayer films, and light representing a color image is synthesized. The synthesized light is projected onto a screen 1300 by the projection lens 1207 as a projection optical system, and an image is enlarged and displayed.

The liquid crystal device 100 described above is applied to the liquid crystal light bulb 1210. The liquid crystal device 100 is disposed between a pair of light-polarizing elements disposed in a crossed-Nicols state on the incident side and the emission side of the color light, with a gap formed between the liquid crystal device 100 and the pair of light-polarizing elements. The same applies to the other liquid crystal light bulbs 1220 and 1230.

According to such a projection-type display apparatus 1000, countermeasures against static electricity to the peripheral circuit are taken as the liquid crystal light bulbs 1210, 1220, and 1230, and a small-sized liquid crystal device 100 is used. Therefore, the projection-type display apparatus 1000 that has tolerance to static electricity and excellent cost performance can be provided. Further, during the assembly process of the projection-type display apparatus 1000, the liquid crystal light bulbs 1210, 1220, and 1230 can be assembled without causing a display defect due to static electricity.

The liquid crystal light bulbs 1210, 1220, and 1230 are not limited to be applied to the liquid crystal device 100 of First Exemplary Embodiment described above. The liquid crystal light bulbs 1210, 1220, and 1230 may be applied to the liquid crystal devices of Second Exemplary Embodiment described above and Third Exemplary Embodiment described above, and exhibit similar effects.

Further, the polarized light illumination apparatus 1100 is not limited to the white light source, and may have a configuration of including LED light sources or laser light sources corresponding to the color light caused to enter the liquid crystal light bulbs 1210, 1220, and 1230.

Note that the present disclosure is not limited to the exemplary embodiments described above, and the exemplary embodiments described above can be variously changed and modified. Such modified examples are described below.

First Modified Example

In the element substrate 10 of each of the exemplary embodiments described above, the plurality of inspection terminals 103 are not limited to be opposed in the X direction and arrayed on both the pair of side portions along the Y direction. It is conceivable that the plurality of inspection terminals 103 are arrayed on one of the side portions. Also in such a case, the configuration of the inspection terminals 103 and the coupling wiring coupled to the inspection terminals 103 and the structure on the base substrate 10s of the present application can be applied. Note that the guard lines 109 serving as the third coupling wiring that couple the plurality of external coupling terminals 104 can also be similarly applied.

Second Modified Example

In the liquid crystal device 100 of First Exemplary Embodiment described above, the counter substrate 20 may overlap with the inspection terminals 103 provided in the third peripheral region E3 of the element substrate 10 in a plan view. For example, even when a conductive foreign matter is interposed between the common electrode 23 on the counter substrate 20 side and the inspection terminals 103 on the element substrate 10 side, a common electric potential applied to the common electrode 23 does not affect the scanning line drive circuit 102 and the inspection circuit 130 through the inspection terminals 103 because the coupling wiring coupled to the inspection terminals 103 of the element substrate 10 are cut off when the mother substrate W is cut off.

Third Modified Example

An electro-optical device to which the substrate for an electro-optical device of the present application can be applied is not limited to the liquid crystal device illustrated in the exemplary embodiments described above, and can also be applied to self-luminous display device including light-emitting elements as the pixels P, for example.

Fourth Modified Example

An electronic apparatus to which the liquid crystal device as the electro-optical device of each of the exemplary embodiments is applied is not limited to the projection-type display apparatus 1000 of Fourth Exemplary Embodiment described above. For example, the liquid crystal device as the electro-optical device of each of the exemplary embodiments can be suitably used as a display unit of a projection-type head-up display (HUD), a direct view-type head-mounted display (HMD), an electronic book, a personal computer, a digital still camera, a liquid crystal television, a view finder-type or monitor direct view-type video recorder, a car navigation system, an electronic notebook, and an information terminal device such as POS.

Contents derived from the exemplary embodiments will be described below.

A substrate for an electro-optical device according to the present application includes a first individual substrate including a first pixel circuit and a first peripheral circuit relating to drive of the first pixel circuit, a second individual substrate including a second pixel circuit and a second peripheral circuit relating to drive of the second pixel circuit, the second individual substrate being disposed next to the first individual substrate in a second direction intersecting a first direction across an imaginary dividing line extending in the first direction, a first coupling terminal disposed along the imaginary dividing line on the first individual substrate, a first coupling wiring configured to couple the first coupling terminal and the first peripheral circuit, a second coupling terminal disposed along the imaginary dividing line on the second individual substrate, and a second coupling wiring configured to couple the second coupling terminal and the second peripheral circuit, wherein the first coupling wiring includes a part crossing the imaginary dividing line, and a part disposed between the second coupling terminal and a third coupling terminal next to the second coupling terminal in the first direction, and the second coupling wiring includes a part crossing the imaginary dividing line, and a part disposed between the first coupling terminal and a fourth coupling terminal next to the first coupling terminal in the first direction.

According to the configuration of the present application, the first coupling terminal and the second coupling terminal can be disposed close to each other, as compared to a case in which the first coupling wiring and the second coupling wiring are disposed to across the dividing line between the first coupling terminal and the second coupling terminal in the second direction. Therefore, the length of the individual substrate in the second direction can be reduced, and thus more individual substrates than in known technology can be laid out on the substrate for an electro-optical device. That is, productivity of the individual substrate can be enhanced, and the substrate for an electro-optical device that can achieve cost reduction can be provided.

In the substrate for an electro-optical device described above, it is preferred that a distance between the first coupling terminal and the second coupling terminal in the second direction is shorter than a distance between the first coupling terminal and the fourth coupling terminal, which are next to each other in the first direction, and a distance between the second coupling terminal and the third coupling terminal, which are next to each other in the first direction.

According to this configuration, the first coupling terminal and the second coupling terminal can be disposed closer to each other than the distance between the first coupling terminal and the fourth coupling terminal adjacent to each other or between the second coupling terminal and third coupling terminal adjacent to each other. Therefore, the length of the individual substrate in the second direction can be reduced, and thus more individual substrates than in known technology can be laid out on the substrate for an electro-optical device. That is, productivity of the individual substrate can be enhanced, and the substrate for an electro-optical device that can achieve cost reduction can be provided.

In the substrate for an electro-optical device described above, it is preferred that a fifth coupling terminal provided on the first individual substrate, a sixth coupling terminal provided on the second individual substrate, and a third coupling wiring electrically coupled to the third coupling terminal and the fourth coupling terminal, wherein a part of the third coupling wiring includes a first part disposed between the first coupling terminal and the fourth coupling terminal, which are next to each other in the first direction across the dividing line, a second part disposed between the second coupling terminal and the third coupling terminal, which are next to each other in the first direction across the dividing line, and a third part connected to the first part and the second part and overlapping the dividing line in a plan view.

According to this configuration, even when static electricity enters the plurality of external coupling terminals, the entering static electricity can be made to flow in the third coupling wiring, and the individual substrate can be protected from the static electricity. Further, the first coupling wiring and the second coupling wiring can be disposed along the first part and the second part of the third coupling wiring between the first coupling terminal and fourth coupling terminal adjacent to each other in the first direction, and between the second coupling terminal and third coupling terminal adjacent to each other in the first direction. In other words, the first coupling wiring and the second coupling wiring can be disposed not to overlap with the third coupling wiring in a plan view. Therefore, static electricity conducted to the third coupling wiring is less liable enter the first coupling wiring and the second coupling wiring. In other words, the individual substrate can be prevented from being damaged due to static electricity entering through the first coupling wiring and the second coupling wiring.

On a base material in the substrate for an electro-optical device described above, it is preferred that the first coupling wiring, the second coupling wiring, and the third coupling wiring are provided in a same wiring layer.

According to this configuration, static electricity conducted to the third coupling wiring is less liable to enter the first coupling wiring and the second coupling wiring, as compared to a case in which the first coupling wiring, the second coupling wiring, and the third coupling wiring are formed in different wire layers with intermediation of an insulating film.

In the substrate for an electro-optical device described above, it is preferred that the first coupling terminal and the second coupling terminal are disposed being displaced from each other in the first direction across the dividing line in the second direction.

According to this configuration, the first coupling wiring and the second coupling wiring can be disposed by efficiently utilizing a space between the adjacent first coupling terminals in the first direction and between the adjacent second coupling terminals in the first direction. Therefore, a disposition pitch of the first coupling terminals and the second coupling terminals in the first direction can be reduced, and thus the length of the individual substrate in the first direction can be reduced.

On the base material in the substrate for an electro-optical device described above, it is preferred that the first coupling wiring and the second coupling wiring are provided on a wiring layer lower than a wiring layer, which is provided with the first coupling terminal and the second coupling terminal, a part of the first coupling wiring is disposed overlapping one side part of the first coupling terminal, and a part of the second coupling wiring is disposed overlapping one side part of the second coupling terminal.

According to this configuration, the first coupling wiring and the second coupling wiring can be disposed by further efficiently utilizing a space between two adjacent first coupling terminals in the first direction and between two adjacent second coupling terminals in the first direction. Therefore, a disposition pitch of the first coupling terminals and the second coupling terminals in the first direction can be further reduced, and thus the length of the individual substrate in the first direction can be further reduced.

An electro-optical device according to the present application includes the individual substrate obtained by dividing the substrate for an electro-optical device described above, a counter substrate disposed opposed to the individual substrate, and an electro-optical element provided between the individual substrate and the counter substrate.

According to the configuration of the present application, the electro-optical device having excellent cost performance can be provided.

An electro-optical device according to the present application includes an element substrate provided with, on a base material, a pixel circuit and a peripheral circuit relating to drive of the pixel circuit wherein the element substrate includes a plurality of first coupling terminals relating to an input signal or an output signal of the peripheral circuit, and a first coupling wiring coupled to each of the plurality of first coupling terminals, the plurality of first coupling terminals are disposed on a side-part side along a first direction on the base material, a part of the first coupling wiring is disposed in a second direction intersecting the first direction between the first coupling terminals which are next to each other in the first direction, and a distance from a center of the first coupling terminal to an edge of the base material in the second direction is shorter than a distance between centers of the first coupling terminals, which are next to each other in the first direction.

According to the present application, the distance between the first coupling terminal and the end portion of the base substrate in the second direction is small as compared to known technology, and thus the element substrate can be miniaturized and the electro-optical device having excellent cost performance can be provided.

An electronic apparatus according to the present disclosure includes the electro-optical device described above.

According to the configuration of the present application, the electronic apparatus having excellent cost performance can be provided.

What is claimed is:

1. A substrate for an electro-optical device comprising:
   a first individual substrate including a first pixel circuit and a first peripheral circuit relating to drive of the first pixel circuit;
   a second individual substrate including a second pixel circuit and a second peripheral circuit relating to drive of the second pixel circuit, the second individual substrate being disposed next to the first individual substrate in a second direction intersecting a first direction across an imaginary dividing line extending in the first direction;
   a first coupling terminal disposed along the imaginary dividing line on the first individual substrate;
   a first coupling wiring configured to couple the first coupling terminal and the first peripheral circuit;
   a second coupling terminal disposed along the imaginary dividing line on the second individual substrate; and
   a second coupling wiring configured to couple the second coupling terminal and the second peripheral circuit, wherein
   the first coupling wiring includes a part crossing the imaginary dividing line, and a part disposed between, and on an imaginary straight line connecting, the second coupling terminal and a third coupling terminal next to the second coupling terminal in the first direction, and
   the second coupling wiring includes a part crossing the imaginary dividing line, and a part disposed between, and on an imaginary straight line connecting, the first coupling terminal and a fourth coupling terminal next to the first coupling terminal in the first direction.

2. The substrate for an electro-optical device according to claim 1, wherein a distance between the first coupling terminal and the second coupling terminal in the second direction is shorter than a distance between the first coupling terminal and the fourth coupling terminal, which are next to each other in the first direction, and a distance between the second coupling terminal and the third coupling terminal, which are next to each other in the first direction.

3. The substrate for an electro-optical device according to claim 1, comprising:
   a fifth coupling terminal provided on the first individual substrate;
   a sixth coupling terminal provided on the second individual substrate; and
   a third coupling wiring electrically coupled to the third coupling terminal and the fourth coupling terminal, wherein
   a part of the third coupling wiring includes a first part disposed between the first coupling terminal and the fourth coupling terminal, which are next to each other in the first direction, across the dividing line, a second part disposed between the second coupling terminal and the third coupling terminal, which are next to each other in the first direction across the dividing line, and a third part connected to the first part and the second part and overlapping the dividing line in a plan view.

4. The substrate for an electro-optical device according to claim 3, wherein the first coupling wiring and the second coupling wiring, and the third coupling wiring are provided in a same wiring layer on a base material.

5. The substrate for an electro-optical device according to claim 1, wherein the first coupling terminal and the second coupling terminal are disposed being displaced from each other in the first direction across the dividing line in the second direction.

6. The substrate for an electro-optical device according to claim 5, wherein
on a base material, the first coupling wiring and the second coupling wiring are provided in a wiring layer lower than a wiring layer provided with the first coupling terminal and the second coupling terminal,
a part of the first coupling wiring is disposed overlapping one side part of the first coupling terminal, and
a part of the second coupling wiring is disposed overlapping one side part of the second coupling terminal.

7. An electro-optical device comprising:
the individual substrate obtained by dividing the substrate for an electro-optical device according to claim 1;
a counter substrate disposed opposed to the individual substrate; and
an electro-optical element provided between the individual substrate and the counter substrate.

8. An electronic apparatus comprising the electro-optical device according to claim 7.

9. An electro-optical device comprising an element substrate provided with, on a base material, a pixel circuit and a peripheral circuit relating to drive of the pixel circuit, wherein
the element substrate includes a plurality of first coupling terminals relating to an input signal or an output signal of the peripheral circuit, and a first coupling wiring coupled to each of the plurality of first coupling terminals,
the plurality of first coupling terminals are disposed on a side-part side along a first direction on the base material,
a part of at least one first coupling wiring is disposed in a second direction intersecting the first direction between, and on an imaginary straight line connecting, two first coupling terminals which are next to each other in the first direction, and
a distance from a center of at least one first coupling terminal to an edge of the base material in the second direction is shorter than a distance between centers of two first coupling terminals, which are next to each other in the first direction.

10. A substrate for an electro-optical device comprising:
a first individual substrate including a first circuit outside a display region;
a second individual substrate including a second circuit outside a display region, the second individual substrate being disposed next to the first individual substrate in a second direction intersecting a first direction across an imaginary dividing line extending in the first direction;
a first coupling terminal disposed along the imaginary dividing line in the first individual substrate;
a second coupling terminal disposed along the imaginary dividing line in the second individual substrate;
a third coupling terminal disposed next to the second coupling terminal in the first direction;
a fourth coupling terminal disposed next to the first coupling terminal in the first direction;
a first coupling wiring configured to couple the first coupling terminal and the first circuit, the first coupling wiring including:
a first part crossing the imaginary dividing line and extending in the second direction between the second coupling terminal and the third coupling terminal,
a second part extending in the first direction between, and on an imaginary straight line connecting, the second coupling terminal and the third coupling terminal, and
a third part extending in a third direction opposite to the second direction between the second coupling terminal and the third coupling terminal and crossing the imaginary dividing line; and
a second coupling wiring configured to couple the third coupling terminal and the second circuit, the second coupling wiring including:
a fifth part crossing the imaginary dividing line and extending in the third direction between the first coupling terminal and the fourth coupling terminal,
a sixth part extending in a fourth direction opposite to the first direction between, and on an imaginary straight line connecting, the first coupling terminal and the fourth coupling terminal, and
a seventh part extending in the second direction between the first coupling terminal and the fourth coupling terminal and crossing the imaginary dividing line.

* * * * *